(12) United States Patent
Ogawa et al.

(10) Patent No.: US 10,955,647 B2
(45) Date of Patent: Mar. 23, 2021

(54) ZOOM LENS AND IMAGE PICKUP APPARATUS

(71) Applicant: CANON KABUSHIKI KAISHA, Tokyo (JP)

(72) Inventors: Naotoshi Ogawa, Utsunomiya (JP); Masao Hori, Utsunomiya (JP); Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 16/287,432

(22) Filed: Feb. 27, 2019

(65) Prior Publication Data
US 2019/0265448 A1 Aug. 29, 2019

(30) Foreign Application Priority Data
Feb. 28, 2018 (JP) .............................. JP2018-034960

(51) Int. Cl.
G02B 15/173 (2006.01)
G02B 13/00 (2006.01)
G02B 13/02 (2006.01)

(52) U.S. Cl.
CPC ......... *G02B 15/173* (2013.01); *G02B 13/009* (2013.01); *G02B 13/0045* (2013.01); *G02B 13/02* (2013.01)

(58) Field of Classification Search
CPC .................. G02B 15/173; G02B 13/0045; G02B 13/009; G02B 13/02
USPC ....................................................... 359/687
See application file for complete search history.

(56) References Cited

U.S. PATENT DOCUMENTS

| | | | |
|---|---|---|---|
| 9,264,638 B2 | 2/2016 | Nakamura et al. |
| 9,268,120 B2 | 2/2016 | Shimomura et al. |
| 9,310,592 B2 | 4/2016 | Wakazono et al. |
| 9,329,372 B2 | 5/2016 | Shimomura |
| 9,400,374 B2 | 7/2016 | Yoshimi et al. |

(Continued)

FOREIGN PATENT DOCUMENTS

| | | |
|---|---|---|
| JP | 2016012118 A | 1/2016 |
| JP | 2017181720 A | 10/2017 |

OTHER PUBLICATIONS

Japanese Office Action dated Jun. 2, 2020 for application No. 2018034960 with English translation.

*Primary Examiner* — Thomas K Pham
*Assistant Examiner* — Mitchell T Oestreich
(74) *Attorney, Agent, or Firm* — Carter, DeLuca & Farrell LLP

(57) ABSTRACT

A zoom lens includes, in order from the object side, a positive first lens unit not moving for zooming, a negative second lens unit moving for zooming, positive third and fourth lens units moving for zooming, and a positive fifth lens unit not moving for zooming. Intervals between adjacent ones of the first to fifth lens units change for zooming. The third lens unit consists of positive, positive, and negative lenses in order from the object side. Appropriate settings are made to the zoom lens's focal lengths at the wide angle and telephoto ends, the lateral magnifications of the second lens unit at the wide angle and telephoto ends, the focal lengths of the third lens unit and the negative lens in the third lens unit, and the average Abbe number of the positive lenses and the Abbe number of the negative lens in the third lens unit.

16 Claims, 15 Drawing Sheets

(56) References Cited

U.S. PATENT DOCUMENTS

| | | |
|---|---|---|
| 9,678,318 B2 | 6/2017 | Nakamura et al. |
| 9,716,829 B2 | 7/2017 | Shimomura |
| 9,904,043 B2 | 2/2018 | Shimomura et al. |
| 2017/0108676 A1 | 4/2017 | Hori |
| 2017/0108678 A1 | 4/2017 | Miyazawa et al. |
| 2018/0224640 A1 | 8/2018 | Shimomura |
| 2019/0025559 A1* | 1/2019 | Tanaka .................. G02B 13/02 |

* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

In recent years, there has been a demand that an image pickup apparatus such as a television camera, a silver-halide film camera, a digital camera, or a video camera be equipped with a zoom lens having a wide angle of view, a high zoom ratio, and high optical performance. As a zoom lens with a wide angle of view and a high zoom ratio, there is known a positive-lead type five-unit zoom lens including five lens units, in which a lens unit having a positive refractive power is disposed closest to the object side.

As a positive-lead type zoom lens, Japanese Patent Application Laid-Open No. 2016-12118 discloses a five-unit zoom lens in which three movable lens units, namely a second unit having a negative refractive power, a third unit having a positive refractive power, and a fourth unit having a positive refractive power, perform zooming and correction of image plane variation caused by the zooming.

In order for a positive-lead type five-unit zoom lens to achieve reduction in size, a high magnification, and high optical performance as well as a wide angle of view, fast zooming operation, and fast response to a zooming operation, it is important to appropriately set the refractive power arrangements, configurations, and the like of the lens units. It is particularly important to appropriately set the configuration and refractive power of the third lens unit as a zooming lens unit. If the refractive power arrangements and configurations are not appropriately set, it is difficult to achieve fast zooming operation and fast response to a zooming operation while maintaining a small size, a high magnification, a wide angle of view, and high optical performance.

In the zoom lens disclosed in Japanese Patent Application Laid-Open No. 2016-12118, the third lens unit consists of a single positive lens or three lenses: a positive lens, a positive lens, and a negative lens. Since this zoom lens undercorrects chromatic aberration at a zoom middle position, there is room for improvement.

SUMMARY OF THE INVENTION

The present disclosure provides, for example, a zoom lens advantageous in a small size, a wide angle of view, high magnification, and high optical performance over an entire zoom range thereof.

To achieve the above objective, a zoom lens of the present invention comprises, in order from an object side to an image side: a first lens unit having a positive refractive power and configured not to move for zooming; a second lens unit having a negative refractive power and configured to move for zooming; a third lens unit having a positive refractive power and configured to move for zooming; a fourth lens unit having a positive refractive power and configured to move for zooming; and a fifth lens unit having a positive refractive power and configured not to move for zooming. An interval between each pair of adjacent lens units of the first to fifth lens units changes for zooming. The third lens unit consists of, in order from the object side to the image side, a positive lens, a positive lens, and a negative lens, and conditional expressions:

$2.1 < (ft/fw)/(\beta 2t/\beta 2w) < 10$, $-0.7 < f3n/f3 < -2.3$, and $10 < vd3p - vd3n < 54$, are satisfied where fw is a focal length of the zoom lens at a wide angle end, ft is a focal length of the zoom lens at a telephoto end, β2w is a lateral magnification of the second lens unit at the wide angle end, β2t is a lateral magnification of the second lens unit at the telephoto end, f3 is a focal length of the third lens unit, f3n is a focal length of the negative lens in the third lens unit, vd3p is an average of Abbe numbers of the positive lenses in the third lens unit, and vd3n is an Abbe number of the negative lens in the third lens unit.

Further features of the present invention will become apparent from the following description of exemplary embodiments with reference to the attached drawings.

DESCRIPTION OF THE EMBODIMENTS

Preferred embodiments of the present invention are described in detail below based on the accompanying drawings.

A zoom lens of the present invention includes, in order from the object side to the image side, a first lens unit L1 having a positive refractive power configured not to move for zooming, a second lens unit L2 having a negative refractive power configured to move for zooming, a third lens unit L3 having a positive refractive power configured to move for zooming, a fourth lens unit L4 configured to move for zooming, and a fifth lens unit L5 having a positive refractive power configured not to move for zooming.

What is meant by a lens unit being configured not to move for zooming is that the lens unit is not driven for zooming, but may be moved for focusing if zooming and focusing are to be performed at the same time. Also note that in the descriptions of the present invention, the borders of lens units are defined in principle by optical surfaces the distances between which change during zooming. In other words, the zoom lens is configured so that the distances between adjacent ones of the first lens unit, the second lens unit, the third lens unit, the fourth lens unit, and the fifth lens unit change during zooming.

Figure 14:
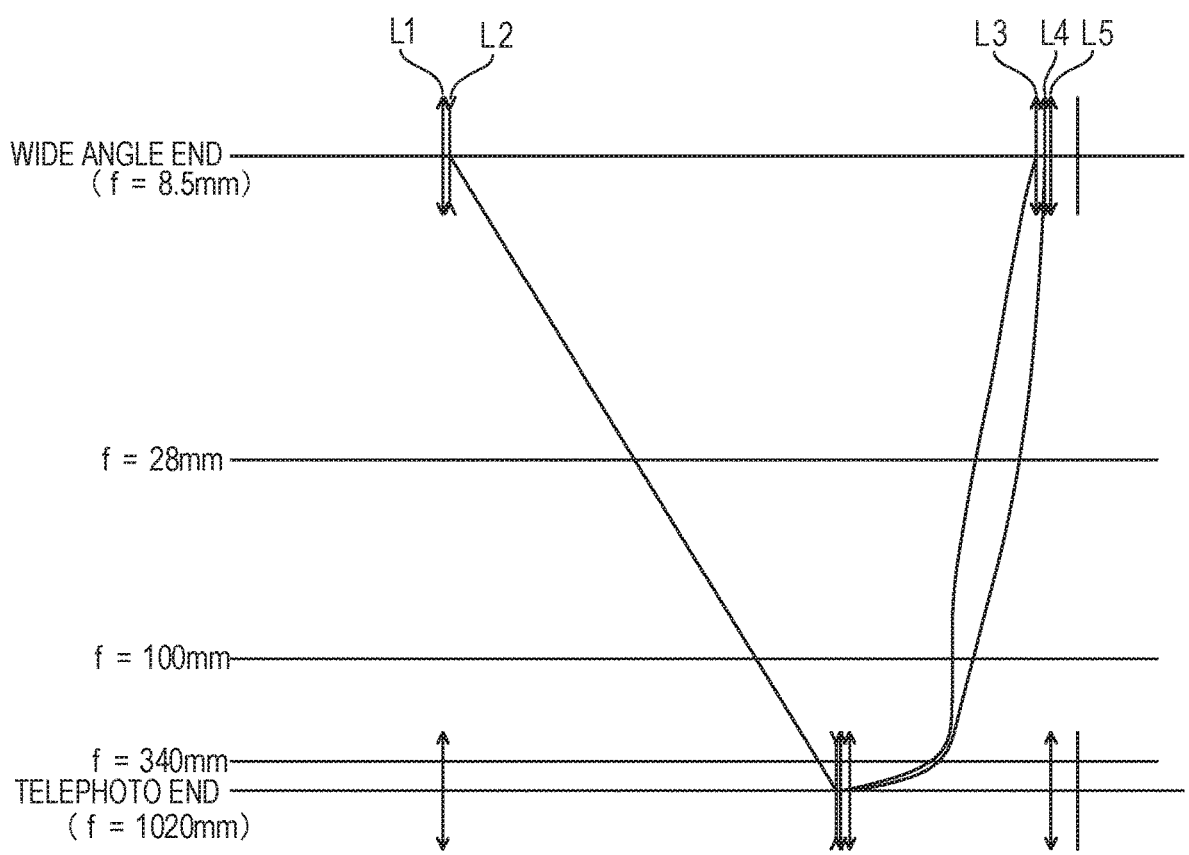
FIG. 14 is a schematic diagram of paraxial refractive power arrangement of Numerical Embodiment 1.

FIG. 14 is a schematic diagram of the paraxial refractive power arrangement of the zoom lens of Numerical Embodiment 1 to be described later, illustrating the paths taken by the second lens unit L2 to the fourth lens unit L4 when they move for zooming.

The upper part of FIG. 14 shows the wide angle end, and the lower part of FIG. 14 shows the telephoto end. The solid lines extending from top to bottom indicate the paths taken by the lens units when they move for zooming. The third lens unit L3 and the fourth lens unit L4 move in such a manner that their distance widens at the focal length of f=28 mm, thereby allowing reduction in the diameter of the first lens unit L1. Further, the third lens unit L3 and the fourth lens unit L4 move in such a manner that their distance shortens at the focal length of f=340 mm, thereby allowing reduction of the diameters of the third lens unit L3 and the fourth lens unit L4. In addition, the third lens unit L3 and the fourth lens unit L4 as a whole take paths moving to the objet side for zooming from the wide angle end to the telephoto end. In other words, as illustrated in FIG. 14, the third lens unit L3 takes a complicated path when moving for zooming from the wide angle end to the telephoto end.

Figure 15A:
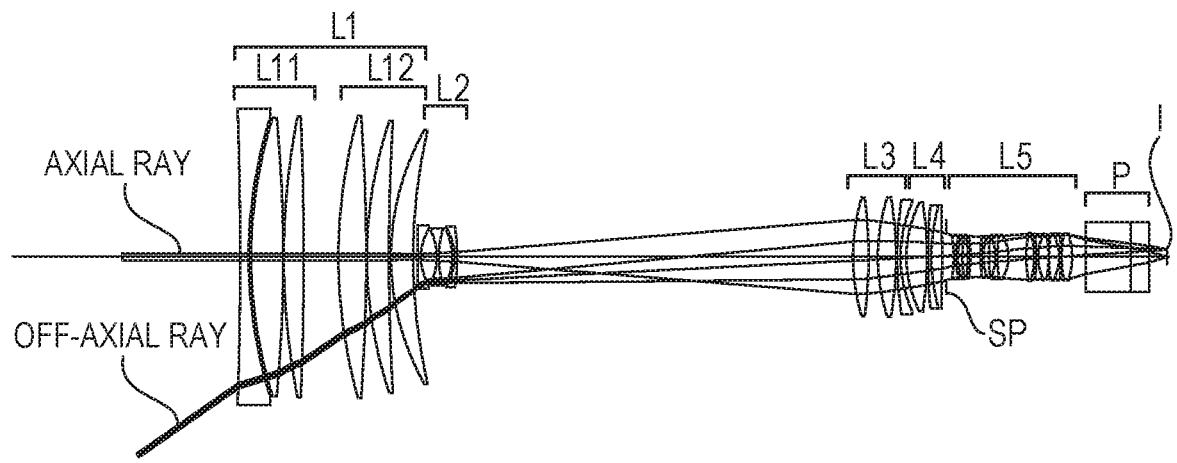
FIG. 15A is a diagram illustrating an optical path in the zoom lens of Numerical Embodiment 1 focused at infinity at the wide angle end.
Figure 15B:
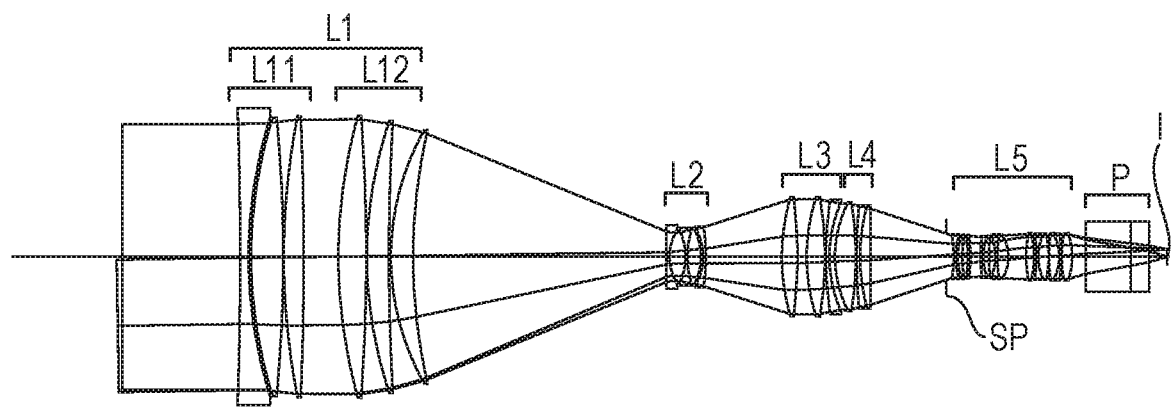
FIG. 15B is a diagram illustrating an optical path in the zoom lens of Numerical Embodiment 1 focused at infinity at f=340 mm.
Figure 15C:
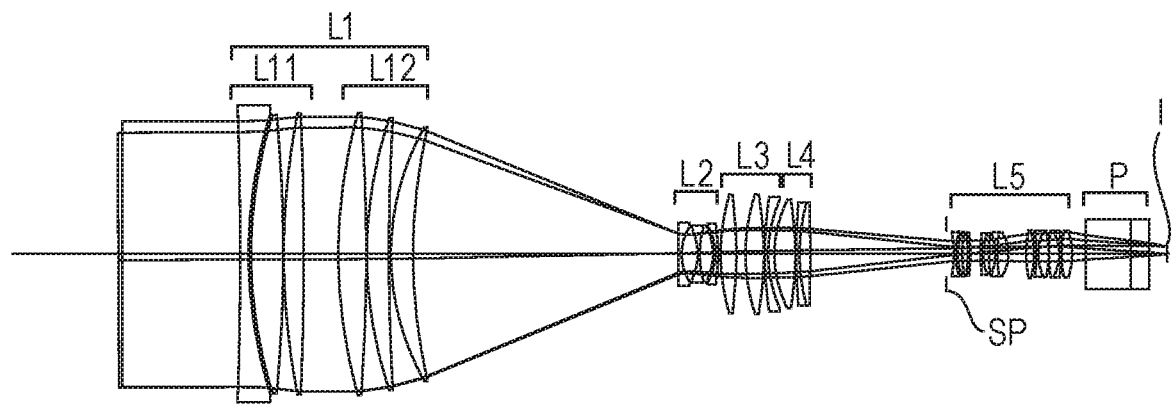
FIG. 15C is a diagram illustrating an optical path in the zoom lens of Numerical Embodiment 1 focused at infinity at the telephoto end.

FIGS. 15A, 15B, and 15C are diagrams of optical paths in the zoom lens of Numerical Embodiment 1 focused at infinity at the wide angle end, at f=340 mm, and at the telephoto end, respectively. As can be seen in FIGS. 15A, 15B, and 15C, the lens diameter of the third lens unit L3 is determined by the axial rays at f=340 mm. Hence, avoiding reduction in the diameter of the first lens unit L1 while trying to achieve a wide angle of view causes the refractive power of the second lens unit L2 to be stronger, which tends to increase the diameter and weight of the third lens unit L3. Moreover, trying to achieve a higher magnification requires the second lens unit L2 to the fourth lens unit L4 to move more, which tends to increase the amount of their work for zooming operation. In other words, trying to achieve a wide angle of view and a high magnification makes it difficult to achieve favorable zooming operability. The number of lenses in the third lens unit may be decreased to reduce the amount of work, but it is then difficult to correct axial chromatic aberration and chromatic aberration of magnification at the above-described zoom position where the distance between the third lens unit L3 and the fourth lens unit L4 widens.

In view of the above points, in the present invention, the configuration and refractive power arrangement of the third lens unit are appropriately set in order for the zoom lens to have a wide angle of view, a high magnification, and high optical performance over the entire zoom range and to achieve favorable zooming operability.

A zoom lens of the present invention comprises, in order from the object side to the image side, a first lens unit having a positive refractive power configured not to move for zooming, a second lens unit having a negative refractive power configured to move for zooming, a third lens unit having a positive refractive power configured to move for zooming, a fourth lens unit having a positive refractive power configured to move for zooming, and a fifth lens unit having a positive refractive power configured not to move for zooming. The third lens unit consists of three lenses which are, in order from the object side to the image side, a positive lens, a positive lens, and a negative lens. The zoom lens satisfies the following conditional expressions:

$$2.1 \le (ft/fw)/(\beta 2t/\beta 2w) \le 10, \text{ and} \tag{1}$$

$$-2.3 \le f3n/f3 \le -0.76, \tag{2}$$

where fw is the focal length of the zoom lens at a wide angle end, ft is the focal length of the zoom lens at a telephoto end, $\beta 2w$ is the lateral magnification of the second lens unit at the wide angle end, $\beta 2t$ is the lateral magnification of the second lens unit at the telephoto end, f3 is the focal length of the third lens unit, and f3n is the focal length of the negative lens in the third lens unit.

Conditional Expression (1) defines the zoom shares borne by the lens units other than the second lens unit L2. Thereby, the lens units other than the second lens unit also bear zoom shares, so that a high magnification can be achieved.

If the upper limit of Conditional Expression (1) is not satisfied, the third lens unit L3 and the fourth lens unit L4 have to move more, which makes it difficult to obtain favorable zooming operability. Or, the refractive powers of the third lens unit L3 and the fourth lens unit L4 are too strong, which makes it difficult to achieve favorable optical performance.

If the lower limit of Conditional Expression (1) is not satisfied, the magnification of the second lens unit L2 is too high at the telephoto end, which makes it difficult to correct axial chromatic aberration at the telephoto end.

It is more preferable when Conditional Expression (1) is set as follows:

$$3.0 \le (ft/fw)/(\beta 2t/\beta 2w) \le 7.0 \tag{1a}$$

Conditional Expression (2) defines the ratio of the focal length of the negative lens in the third lens unit L3 to the focal length of the third lens unit L3. Thereby, the distance between the third lens unit L3 and the fourth lens unit L4 is long at a zoom middle position, and even if the distance shortens, variation of axial chromatic aberration and chromatic aberration of magnification caused by zooming can be favorably corrected.

If the upper and lower limits of Conditional Expression (2) are not satisfied, correction of chromatic aberration by the third lens unit is insufficient, which makes it difficult to correct axial chromatic aberration and chromatic aberration of magnification at a zoom middle position.

It is more preferable when Conditional Expression (2) is set as follows:

$$-2.3 \le f3n/f3 \le -0.79. \tag{2a}$$

It is preferable that the zoom lens of the present invention further satisfies the following conditional expressions:

$$1.2 < |ft/f1| < 5.0, \text{ and} \tag{3}$$

$$3.0 < |f1/f2| < 15.0, \tag{4}$$

where f1 is the focal length of the first lens unit, and f2 is the focal length of the second lens unit. Conditional Expression (3) defines the ratio of the focal length of the zoom lens at the telephoto end to the focal length of the first lens unit L1. By satisfying Conditional Expression (3), the zoom lens can favorably correct aberrations at the telephoto end while achieving a high magnification.

If the upper limit of Conditional Expression (3) is not satisfied, it is advantageous in reducing the size of the zoom lens, but it is difficult to achieve high optical performance at the telephoto end, i.e., to favorably correct axial chromatic aberration in particular.

If the lower limit of Conditional Expression (3) is not satisfied, the focal length of the first lens unit increases, which makes it difficult for the zoom lens to achieve a high magnification and reduction in size at the same time. It is more preferable when Conditional Expression (3) is set as follows:

$$3.0 < |ft/f1| < 5/0. \tag{3a}$$

Conditional Expression (4) defines the ratio of the focal length f1 of the first lens unit L1 to the focal length f2 of the second lens unit L2. By satisfying Conditional Expression (4), the zoom lens can favorably correct aberrations at the telephoto end while achieving a wide angle of view.

If the upper limit of Conditional Expression (4) is not satisfied, the focal length of the first lens unit L1 is relatively long, which increases the lens diameter of the first lens unit L1 and thus makes it difficult to achieve a wide angle of view.

If the lower limit of Conditional Expression (4) is not satisfied, the focal length of the first lens unit L1 is relatively short, which makes it difficult to correct spherical aberration variation and axial chromatic aberration at the telephoto end. It is more preferable when Conditional Expression (4) is set as follows:

$$4.5 < |f1/f2| < 11.0. \tag{4a}$$

It is preferable that the zoom lens of the present invention further satisfies the following condition:

$$10 < vd3p - vd3n < 54, \tag{5}$$

where vd3p is the average of the Abbe numbers of the positive lenses in the third lens unit, and vd3n is the Abbe number of the negative lens in the third lens unit. Conditional Expression (5) appropriately sets the materials used for the third lens unit to make it possible to favorably correct zooming-caused variation of axial chromatic aberration and chromatic aberration of magnification at a zoom middle position.

If the upper and lower limits of Conditional Expression (5) are not satisfied, correction of chromatic aberration by the third lens unit is insufficient, which makes it difficult to correct chromatic aberration of magnification and axial chromatic aberration at a zoom middle position. It is more preferable when Conditional Expression (5) is set as follows:

$$35 < vd3p - vd3n < 52. \tag{5a}$$

It is preferable that the zoom lens of the present invention further satisfies the following conditional expression:

$$1.6 < Nd3a, \tag{6}$$

where Nd3a is the refractive index of the lens closest to the object side in the third lens unit. Conditional Expression (6) defines the refractive index of the third lens unit L3. When Conditional Expression (6) is satisfied, the position of the object-side principle point of the third lens unit L3 can be shifted to the object side, which makes it possible to favorably correct aberrations at a zoom middle position while achieving a high magnification. It is more preferable when Conditional Expression (6) is set as follows:

$$1.6 < Nd3a < 1.75. \tag{6a}$$

It is preferable that the zoom lens of the present invention further satisfies the following conditional expression:

$$0.02 < (L34z1 - L34w)/L23w < 0.2, \tag{7}$$

where L23w is the distance between the second lens unit L2 and the third lens unit L3 at the wide angle end, L34w is the distance between the third lens unit L3 and the fourth lens unit L4 at the wide angle end, and L34z1 is the distance between the third lens unit L3 and the fourth lens unit L4 at a zoom position z1 where a zoom ratio is $z^{0.25}$, z being the zoom ratio of the zoom lens. Conditional Expression (7) defines the difference between the distance between the third lens unit L3 and the fourth lens unit L4 at the zoom position z1 and that at the wide angle end. Thereby, the zoom lens can achieve reduction in the diameter of the first lens unit L1 and favorable zooming operability while achieving a wide angle of view.

If the upper limit of Conditional Expression (7) is not satisfied, the amounts of movement of the third lens unit L3 and the fourth lens unit L4 increase, which makes it difficult to obtain favorable zooming operability.

If the lower limit of Conditional Expression (7) is not satisfied, the distance between the third lens unit L3 and the fourth lens unit L4 at the zoom position z1 is not wider than that at the wide angle end, which makes it difficult to reduce the lens diameter of the first lens unit L1.

It is preferable that the zoom lens of the present invention further satisfies the following conditional expression:

$$0.8 < f3/f4 < 1.7, \tag{8}$$

where f3 is the focal length of the third lens unit L3, and f4 is the focal length of the fourth lens unit L4. Conditional Expression (8) defines the ratio of the focal length of the third lens unit L3 to the focal length of the fourth lens unit L4. Thereby, the amount of movement of the third lens unit L3 can be reduced, which decreases the amount of work of the third lens unit L3 and thus enables favorable zooming operability.

If the upper limit of Conditional Expression (8) is not satisfied, the amount of movement of the third lens unit L3 increases, which makes it difficult to obtain favorable zooming operability.

If the lower limit of Conditional Expression (8) is not satisfied, the amount of movement of the fourth lens unit L4 increases too much, which makes the total length of the zooming part long and makes reduction in size and weight difficult. It is more preferable when Conditional Expression (8) is set as follows:

$$1.0 < f3/f4 < 1.7. \tag{8a}$$

It is preferable that the zoom lens of the present invention further satisfies the following conditional expression:

$$0.05 < m3/Td < 0.3, \tag{9}$$

where m3 is the amount of displacement of the third lens unit L3 on the optical axis from the wide angle end to the telephoto end, and Td is the distance from the vertex of the lens surface closest to the object side in the zoom lens to the vertex of the lens surface closest to the image side in the zoom lens. Conditional Expression (9) defines the amount of movement of the third lens unit L3. Thereby, the zoom lens can obtain favorable zooming operability while achieving a wide angle of view and a high magnification.

If the upper limit of Conditional Expression (9) is not satisfied, the amount of movement of the third lens unit L3 is too long, which makes it difficult to obtain favorable zooming operability.

If the lower limit of Conditional Expression (9) is not satisfied, the amount of movement of the third lens unit L3 is too short, which makes it difficult to reduce the lens diameter of the first lens unit L1 while achieving a wide angle of view. It is more preferable when Conditional Expression (9) is set as follows:

$$0.12 < m3/Td < 0.2. \tag{9a}$$

As described earlier, in the descriptions of the present invention, the borders of lens units are defined in principle by optical surfaces the distances between which change during zooming. However, in the present invention, only when the second lens unit L2 satisfies the following Conditional Expression (10), the second lens unit may consist of, in order from the object side, a 2a lens unit and a 2b lens unit. In this case, the zoom lens satisfies the following conditional expression:

$$0.9 < m2a/m2b < 1.1, \tag{10}$$

where m2a is the amount of displacement of the 2a lens unit on the optical axis from the wide angle end to the telephoto end, and m2b is the amount of displacement of the 2b lens unit on the optical axis from the wide angle end to the telephoto end. In other words, the second lens unit L2 may consist of an integrally configured single lens unit or of two lens units satisfying Conditional Expression (10). In the latter case, the 2a lens unit and the 2b lens unit both move for zooming, and the combined refractive power of the 2a lens unit and the 2b lens unit is negative. By causing the 2a lens unit and the 2b lens unit in the second lens unit L2 to move slightly different paths for zooming, variation of performance during zooming can be improved compared to when the second lens unit L2 is integrally configured. However, if the upper and lower limits of Conditional Expression (10) are not satisfied, such a configuration makes it difficult to correct axial chromatic aberration and is therefore not preferable.

The following describes the characteristics of the zoom lenses of the embodiments of the present invention.

Embodiment 1

A zoom lens of Embodiment 1 of the present invention includes, in order from the object side to the image side, a first lens unit L1 having a positive refractive power configured not to move for zooming, a second lens unit L2 having a negative refractive power configured to move for zooming, a third lens unit L3 having a positive refractive power configured to move for zooming, a fourth lens unit L4 having a positive refractive power configured to move for zooming, and a fifth lens unit L5 having a positive refractive power configured not to move for zooming and configured to perform image formation. In each lens sectional diagram, the left hand is the subject (object) side (or the front side), and the right hand is the image side (or the rear side).

The first lens unit L1 includes a stationary lens unit L11 configured not to move for focusing and a focus lens unit L12 configured to move to the object side for focusing from infinity to close-up. The zoom lens of Embodiment 1 performs zooming and correction of image plane variation caused by the zooming by causing the second lens unit L2 to the fourth lens unit L4 to move on the optical axis with the distances therebetween changing. These three lens units (the second lens unit L2 to the fourth lens unit L4) form the zooming system.

Figure 1:
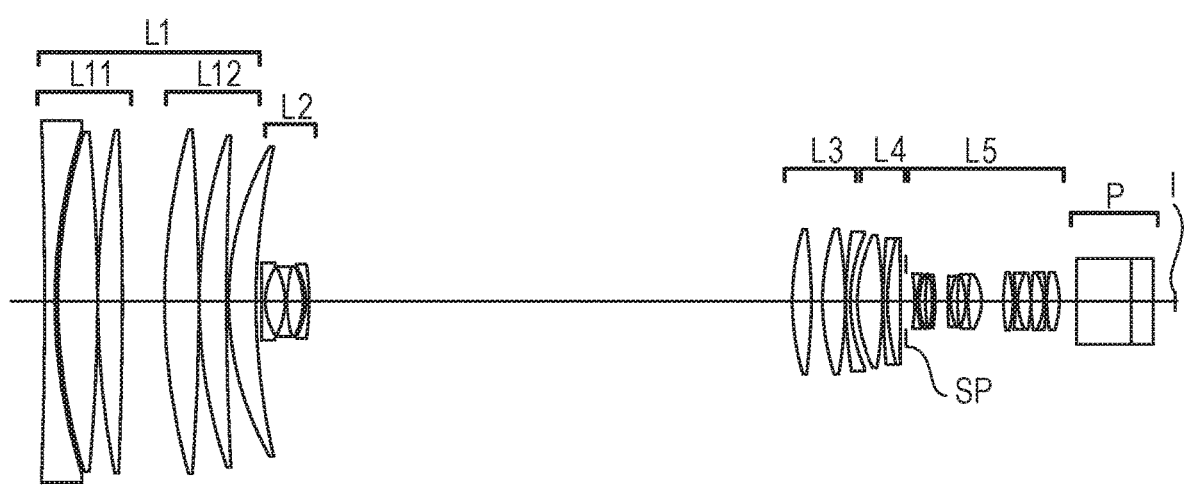
FIG. 1 is a lens sectional view of a zoom lens according to Numerical Embodiment 1 focused at infinity at the wide angle end.
Figure 2A:
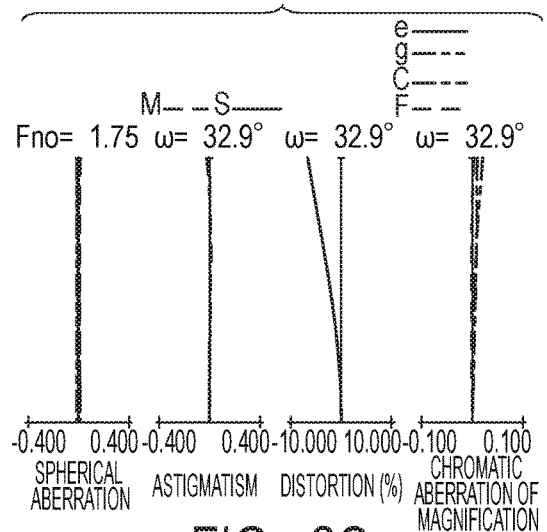
FIG. 2A is a longitudinal aberration diagram of the zoom lens according to Numerical Embodiment 1 focused at infinity at the wide angle end.
Figure 2B:
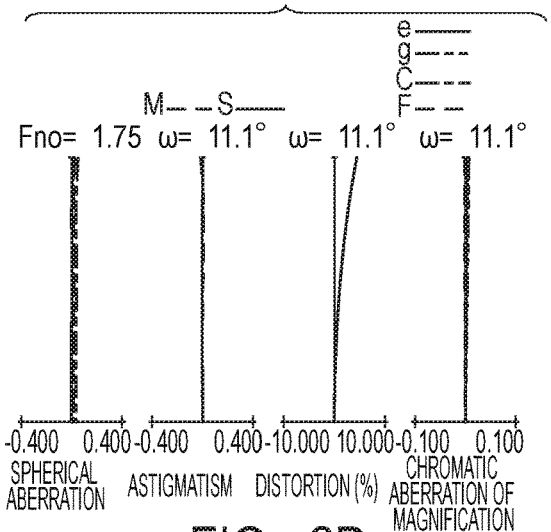
FIG. 2B is a longitudinal aberration diagram of the zoom lens according to Numerical Embodiment 1 focused at infinity at f=28.1 mm.
Figure 2C:
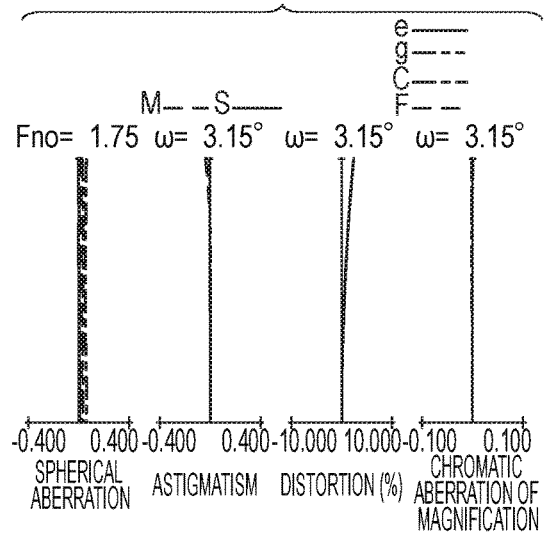
FIG. 2C is a longitudinal aberration diagram of the zoom lens according to Numerical Embodiment 1 focused at infinity at f=100 mm.
Figure 2D:
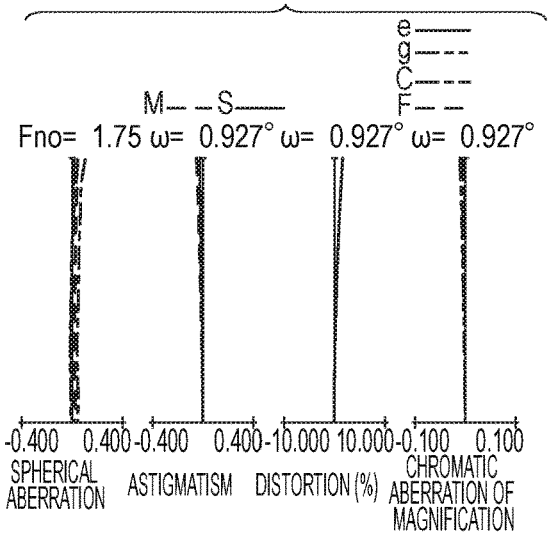
FIG. 2D is a longitudinal aberration diagram of the zoom lens according to Numerical Embodiment 1 focused at infinity at f=340 mm.
Figure 2E:
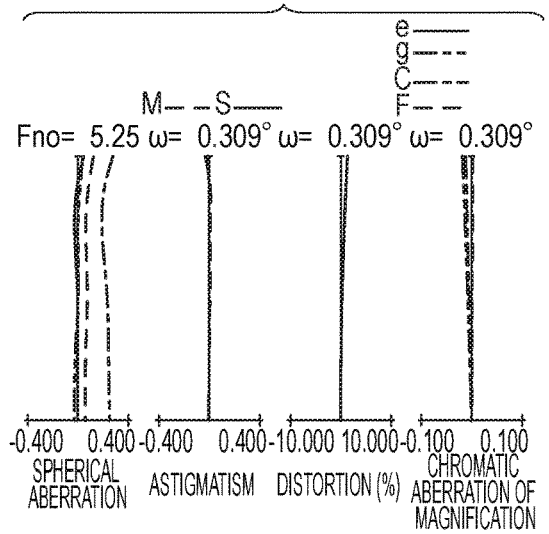
FIG. 2E is a longitudinal aberration diagram of the zoom lens according to Numerical Embodiment 1 focused at infinity at the telephoto end.

FIG. 1 is a lens sectional diagram of the zoom lens of Embodiment 1 (Numerical Embodiment 1) of the present invention focused at infinity at the wide angle end (at a focal length of f=8.5 mm). On the image side of the fifth lens unit L5 in the lens sectional diagram, the zoom lens includes, in order from the object side, an aperture (an aperture stop) SP, a glass block P representing a color separation prism, an optical filter, or the like, and an image plane I. The image plane I corresponds to the image plane of, for example, a solid-state image pickup element (photo-electric conversion element) that receives an optical image formed by the zoom lens and performs photo-electric conversion. This applies to the rest of the embodiments as well.

In the zoom lens of Embodiment 1, the first lens unit L1 corresponds to the 1st to 12th lens surfaces. The second lens unit L2 corresponds to the 13th to 19th lens surfaces. The third lens unit L3 corresponds to the 20th to 25th lens surfaces. The fourth lens unit L4 corresponds to the 26th to 30th lens surfaces.

For zooming from the wide angle end to the telephoto end, the second lens unit L2 moves linearly to the image side, and meanwhile the third lens unit L3 and the fourth lens unit L4 move substantially from the image side to the object side while describing non-linear paths at a zoom middle position. The third lens unit L3 moves to the object side once near a zoom position z1 (f=28.13 mm) close to the wide angle end to correct aberration variation, and then moves substantially from the image side to the object side while describing non-linear paths.

Among the five zoom positions in Numerical Embodiment 1 to be shown later, the second one is the zoom position z1 (f=28.13 mm), and the lens diameter of the first lens unit L1 is determined near this focal length. The lens diameters of the third lens unit L3 and the fourth lens unit L4 are determined near the focal length at the fourth zoom position (f=340 mm).

The 13th, 21st, and 30th lens surfaces are aspherical. The 13th lens surface mainly corrects distortion at the wide angle end, and the 21st and 30th lens surfaces correct axial aberration such as comatic aberration at the wide angle end and spherical aberration at the telephoto end. FIGS. 2A, 2B, 2C, 2D, and 2E are aberration diagrams of the zoom lens of Numerical Embodiment 1 focused at infinity at the wide angle end, f=28.53 mm, f=100 mm, f=340 mm, and the telephoto end, respectively. Note that the focal lengths are values in the numerical embodiment to be described later expressed in millimeters. This applies to the rest of the embodiments below.

In each aberration diagram, in the section for spherical aberration, the solid line, the dot-dot-dash line, the dot-dash line, and the dotted line denote e-line, g-line, C-line, and F-line, respectively. In the section for astigmatism, the dotted line and the solid line denote the meridional image plane and the sagittal image plane, respectively. In the section for chromatic aberration of magnification, the dot-dot-dash line, the dot-dash line, and the dotted line denote g-line, C-line, and F-line, respectively. Further, ω denotes a half angle of view, and Fno denotes an f-number. In each longitudinal aberration diagram, spherical aberration is depicted on a scale of 0.4 mm; astigmatism, on a scale of 0.4 mm; distortion, on a scale of 10%; and chromatic aberration of magnification, on a scale of 0.1 mm. Note that in the following embodiments, the wide angle end and the telephoto end refer to zoom positions which are available ends of the zoom range in which the second lens unit U2 for zooming can move on the optical axis mechanically.

Numerical value data related to Embodiment 1 are demonstrated below as Numerical Embodiment 1. In each numerical embodiment, i indicates the ordinal number of a surface from the object side; ri, the radius of curvature of the i-th surface from the object side; di, the distance between the i-th surface and the (i+1)-th surface from the object side; and ndi and vdi, the refractive index and the Abbe number, respectively, of an optical member between the i-th surface and the (i+1)-th surface from the object side. Aspherical surfaces have an asterisk added next to their surface numbers. The last three surfaces are those of a glass block such as a filter.

With an X axis being the optical-axis direction, an H axis being perpendicular to the optical axis, a light travelling direction being positive, R being a paraxial curvature radius, k being a conic constant, and A3 to "A16" each being an aspherical coefficient, an aspherical shape is expressed as follows. Note that e-Z indicates ×10-Z. This applies to the rest of the numerical embodiments.

$$X = \frac{H^2/R}{1+\sqrt{1-(1+k)(H/R)^2}} + A4H^4 + A6H^6 + A8H^8 +$$
$$A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

[Expression 1]

Table 1 shows values corresponding to the conditional expressions of Embodiment 1. The zoom lens of Embodiment 1 satisfies Expressions (1) to (9), and thereby achieves a wide angle of view, a high magnification, high optical performance over the entire zoom range, and favorable zooming operability. The zoom lens of the present invention has to satisfy Expressions (1) and (2), but does not necessarily have to satisfy Expressions (3) to (9). Nonetheless, better effects can be produced when at least one of Expressions (3) to (9) is satisfied. This applies to the rest of the embodiments as well.

Figure 13:
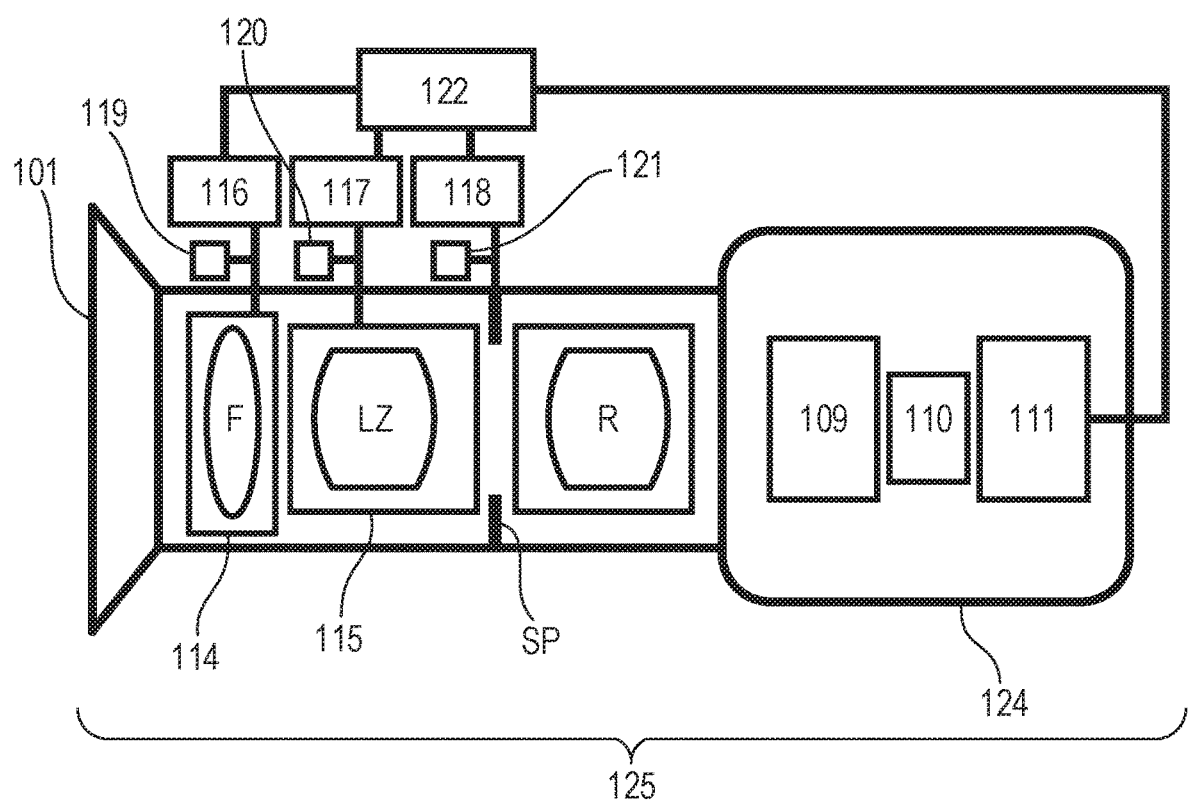
FIG. 13 is a main-part schematic diagram of an image pickup apparatus of the present invention.

FIG. 13 is a schematic diagram of an image pickup apparatus (a television camera system) using the zoom lens of any of the embodiments as its imaging optical system. In FIG. 13, 101 denotes the zoom lens of any one of Embodiments 1 to 6; 124, a camera to and from which the zoom lens 101 is attachable and detachable; and 125, an image pickup apparatus formed by attachment of the zoom lens 101 to the camera 124. The zoom lens 101 has a first lens unit F, a zooming part LZ, and a rear lens group R for image formation. The first lens unit F includes a focus lens unit. The zooming part LZ includes a second lens unit and a third lens unit which are configured to move on the optical axis for zooming and a fourth lens unit configured to move on the optical axis to correct image plane variation caused by the zooming. SP denotes an aperture stop. 114 and 115 are driving mechanisms, such as a helicoid or a cam, to drive the first lens unit F and the zooming part LZ, respectively, in the optical-axis direction. 116, 117, and 118 are motors (driving means) to electrically drive the driving mechanism 114, the driving mechanism 115, and the aperture stop SP, respectively. 119, 120, and 121 are detectors, such as an encoder, a potentiometer, or a photosensor, to detect the positions of the first lens unit F and the zooming part LZ on the optical axis and the aperture diameter of the aperture stop SP. In the camera 124, 109 denotes a glass block equivalent to an optical filter or a color separation optical system in the camera 124, and 110 denotes a solid-state image pickup element (photo-electric conversion element) such as a CCD or CMOS sensor to receive a subject image formed by the zoom lens 101. Further, 111 and 122 are CPUs to control the driving of various parts of the camera 124 and the zoom lens 101.

An image pickup apparatus with high optical performance can be obtained when the zoom lens of the present invention is thus applied to a television camera.

Embodiment 2

A zoom lens of Embodiment 2 of the present invention includes, in order from the object side, a first lens unit L1 having a positive refractive power configured not to move for zooming, a second lens unit L2 having a negative refractive power configured to move for zooming, a third lens unit L3 having a positive refractive power configured to move for zooming, a fourth lens unit L4 having a positive refractive power configured to move for zooming, and a fifth lens unit L5 having a positive refractive power configured not to move for zooming and configured to perform image formation.

The first lens unit L1 includes a stationary lens unit L11 configured not to move for focusing and a focus lens unit L12 configured to move to the object side for focusing from infinity to close-up. The zoom lens of Embodiment 2 performs zooming and correction of image plane variation caused by the zooming by causing the second lens unit L2 to the fourth lens unit L4 to move on the optical axis with the distances therebetween changing. These three lens units (the second lens unit L2 to the fourth lens unit L4) form the zooming system.

Figure 3:
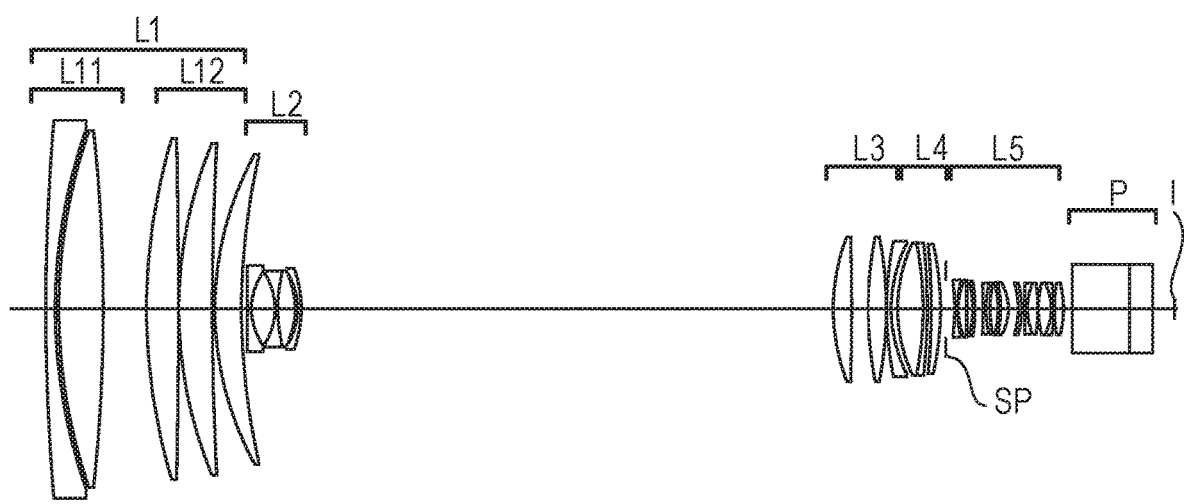
FIG. 3 is a lens sectional view of a zoom lens according to Numerical Embodiment 2 focused at infinity at the wide angle end.
Figure 4A:
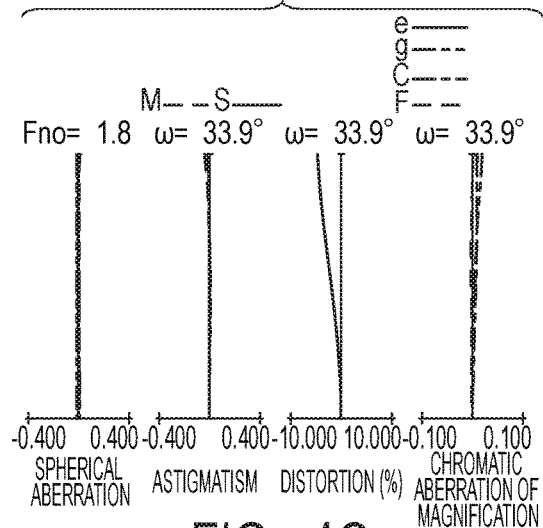
FIG. 4A is a longitudinal aberration diagram of the zoom lens according to Numerical Embodiment 2 focused at infinity at the wide angle end.
Figure 4B:
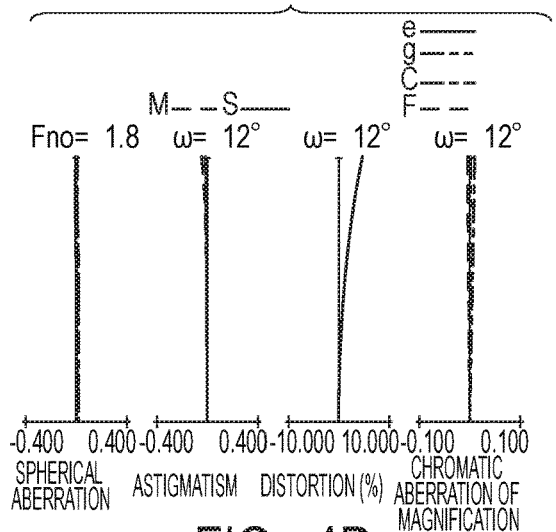
FIG. 4B is a longitudinal aberration diagram of the zoom lens according to Numerical Embodiment 2 focused at infinity at f=25.9 mm.
Figure 4C:
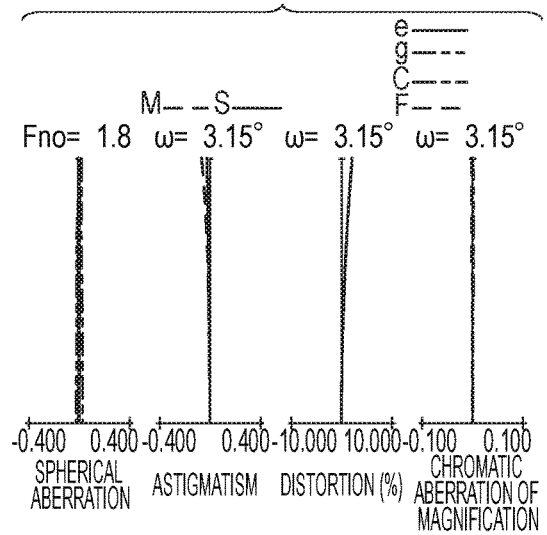
FIG. 4C is a longitudinal aberration diagram of the zoom lens according to Numerical Embodiment 2 focused at infinity at f=100 mm.
Figure 4D:
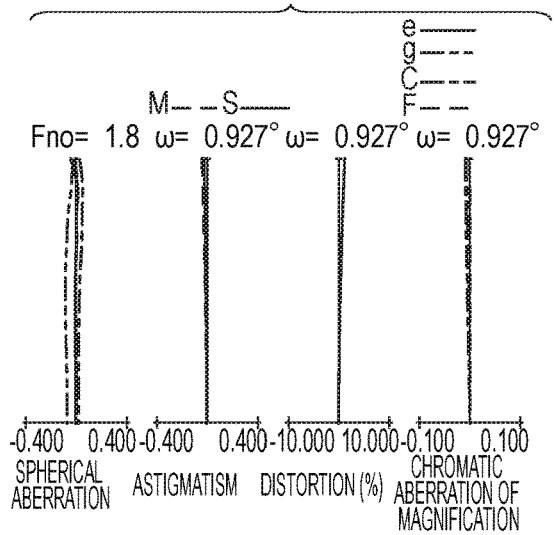
FIG. 4D is a longitudinal aberration diagram of the zoom lens according to Numerical Embodiment 2 focused at infinity at f=340 mm.
Figure 4E:
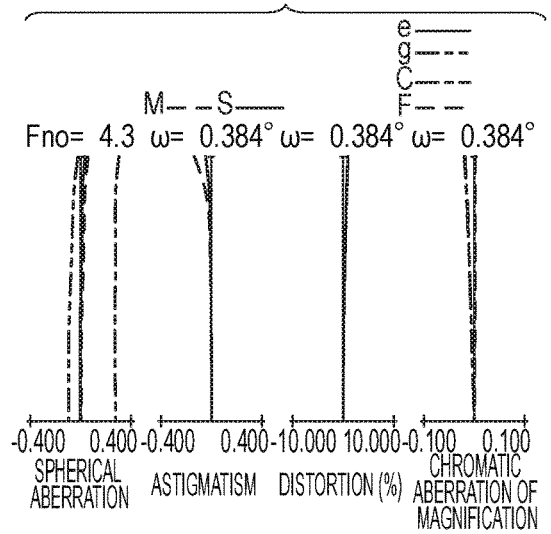
FIG. 4E is a longitudinal aberration diagram of the zoom lens according to Numerical Embodiment 2 focused at infinity at the telephoto end.

FIG. 3 is a lens sectional diagram of the zoom lens of Numerical Embodiment 2 of the present invention focused at infinity at the wide angle end (at a focal length of f=8.2 mm). In the zoom lens of Embodiment 2, the first lens unit L1 corresponds to the 1st to 10th lens surfaces. The second lens unit L2 corresponds to the 11th to 17th lens surfaces. The third lens unit L3 corresponds to the 18th to 23rd lens surfaces. The fourth lens unit L4 corresponds to the 24th to 28th lens surfaces.

For zooming from the wide angle end to the telephoto end, the second lens unit L2 moves linearly to the image side, and meanwhile the third lens unit L3 and the fourth lens unit LA move substantially from the image side to the object side while describing non-linear paths at a zoom middle position. The third lens unit L3 moves to the object side once near a zoom position z1 (f=25.93 mm) close to the wide angle end to correct aberration variation, and then moves substantially from the image side to the object side while describing non-linear paths.

Among the five zoom positions in Numerical Embodiment 2 to be shown later, the second one is the zoom position z1 (f=25.93 mm), and the lens diameter of the first lens unit L1 is determined near this focal length. The lens diameters of the third lens unit L3 and the fourth lens unit L4 are determined near the focal length at the fourth zoom position (f=340 mm).

The 11th, 19th, and 27th lens surfaces are aspherical. The 11th lens surface mainly corrects distortion at the wide angle end, and the 19th and 27th lens surfaces correct axial aberration such as comatic aberration at the wide angle end and spherical aberration at the telephoto end. FIGS. 4A, 4B, 4C, 4D, and 4E are aberration diagrams of the zoom lens of Numerical Embodiment 2 focused at infinity at the wide angle end, f=25.93 mm, f=100 mm, f=340 mm, and the telephoto end, respectively.

The zoom lens of Embodiment 2 satisfies Expressions (1) to (9), and thereby achieves a wide angle of view, a high magnification, high optical performance over the entire zoom range, and favorable zooming operability.

Embodiment 3

A zoom lens of Embodiment 3 of the present invention includes, in order from the object side, a first lens unit L1 having a positive refractive power configured not to move for zooming, a second lens unit L2 having a negative refractive power configured to move for zooming, a third lens unit L3 having a positive refractive power configured to move for zooming, a fourth lens unit L4 having a positive refractive power configured to move for zooming, and a fifth lens unit L5 having a positive refractive power configured not to move for zooming and configured to perform image formation.

The first lens unit L1 includes a stationary lens unit L11 configured not to move for focusing and a focus lens unit L12 configured to move to the object side for focusing from infinity to close-up. The zoom lens of Embodiment 3 performs zooming and correction of image plane variation caused by the zooming by causing the second lens unit L2 to the fourth lens unit L4 to move on the optical axis with the distances therebetween changing. These three lens units (the second lens unit L2 to the fourth lens unit L4) form the zooming system.

Figure 5:
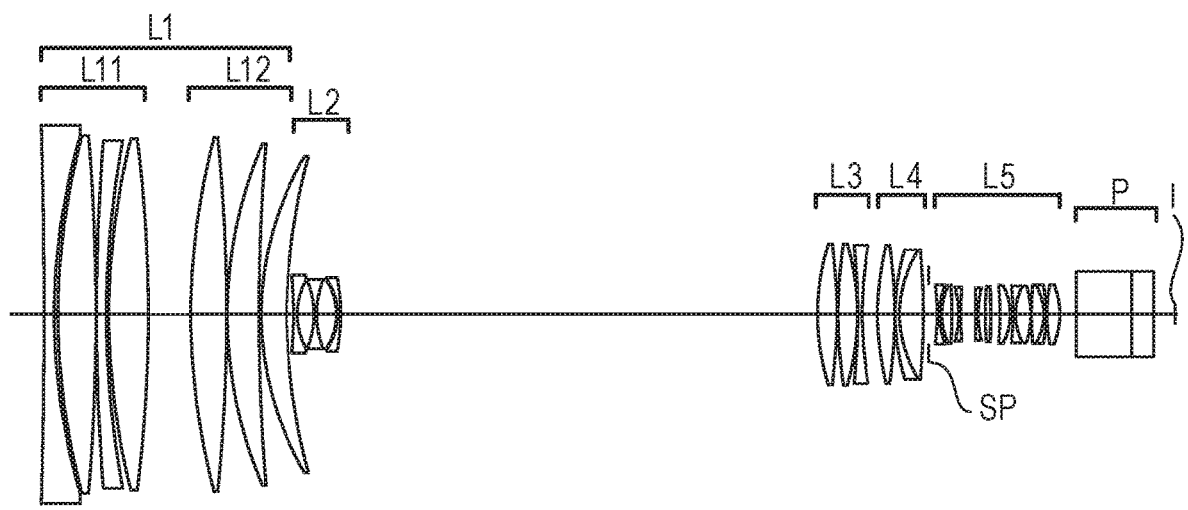
FIG. 5 is a lens sectional view of a zoom lens according to Numerical Embodiment 3 focused at infinity at the wide angle end.
Figure 6A:
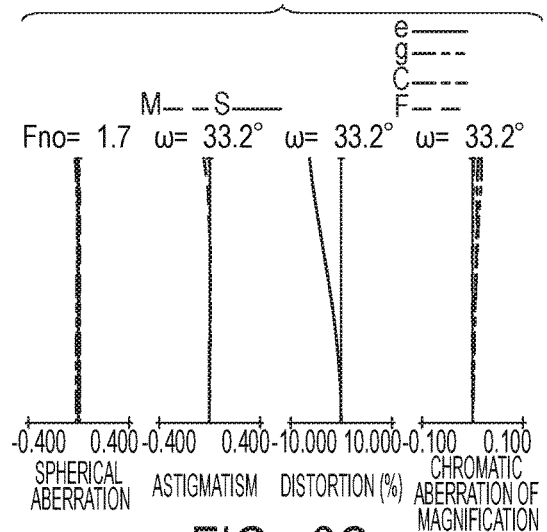
FIG. 6A is a longitudinal aberration diagram of the zoom lens according to Numerical Embodiment 3 focused at infinity at the wide angle end.
Figure 6B:
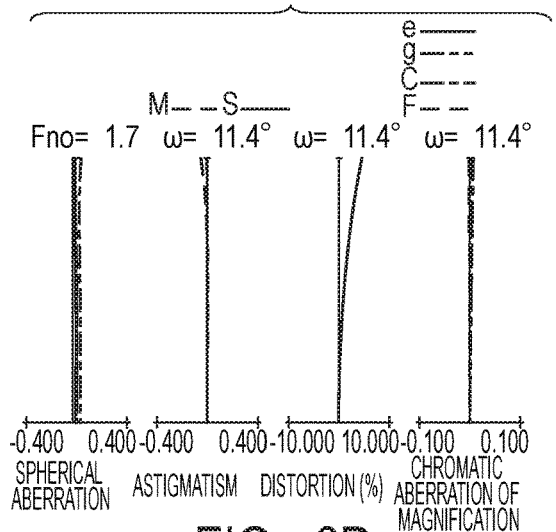
FIG. 6B is a longitudinal aberration diagram of the zoom lens according to Numerical Embodiment 3 focused at infinity at f=27.2 mm.
Figure 6C:
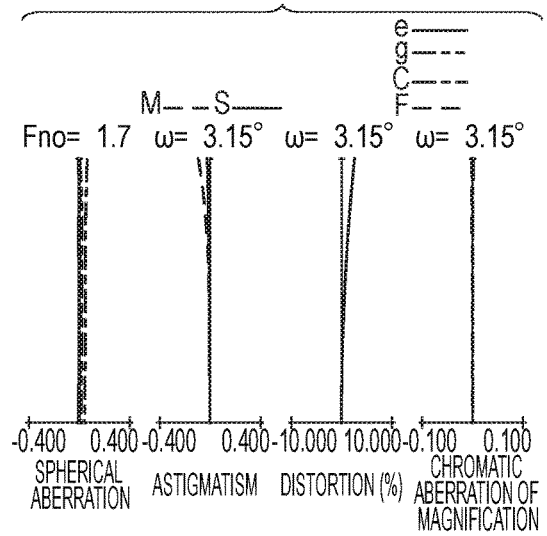
FIG. 6C is a longitudinal aberration diagram of the zoom lens according to Numerical Embodiment 3 focused at infinity at f=100 mm.
Figure 6D:
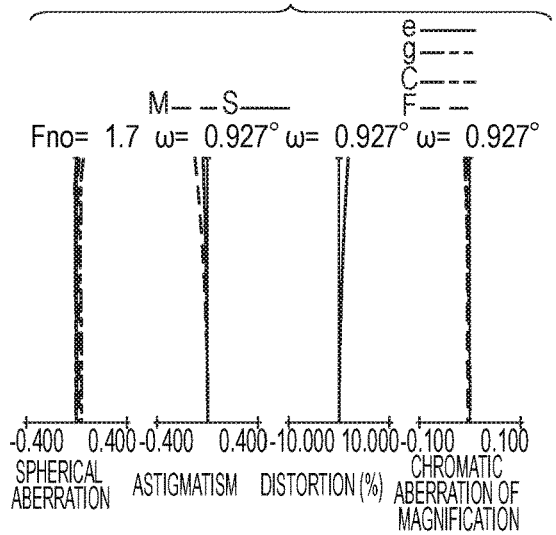
FIG. 6D is a longitudinal aberration diagram of the zoom lens according to Numerical Embodiment 3 focused at infinity at f=340 mm.
Figure 6E:
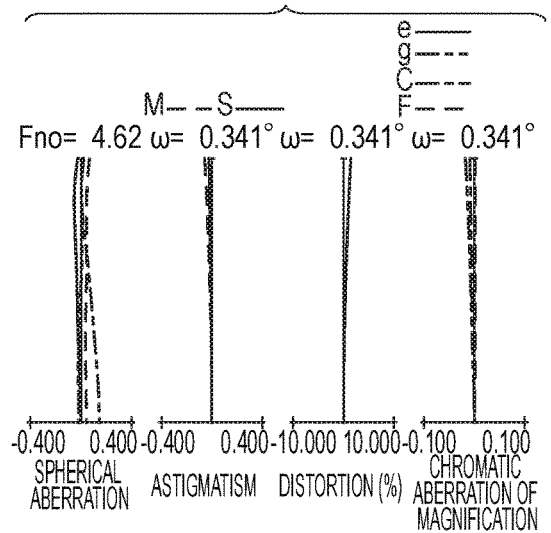
FIG. 6E is a longitudinal aberration diagram of the zoom lens according to Numerical Embodiment 3 focused at infinity at the telephoto end.

FIG. 5 is a lens sectional diagram of the zoom lens of Numerical Embodiment 3 of the present invention focused at infinity at the wide angle end (at a focal length of f=8.4 mm). In the zoom lens of Embodiment 3, the first lens unit L1 corresponds to the 1st to 14th lens surfaces. The second lens unit L2 corresponds to the 15th to 21st lens surfaces. The third lens unit L3 corresponds to the 22nd to 27th lens surfaces. The fourth lens unit L4 corresponds to the 28th to 32nd lens surfaces.

For zooming from the wide angle end to the telephoto end, the second lens unit L2 moves linearly to the image side, and meanwhile the third lens unit L3 and the fourth lens unit L4 move substantially from the image side to the object side while describing non-linear paths at a zoom middle position. The third lens unit L3 moves to the object side once near a zoom position z1 (f=27.20 mm) close to the wide angle end to correct aberration variation, and then moves substantially from the image side to the object side while describing non-linear paths.

Among the five zoom positions in Numerical Embodiment 3 to be shown later, the second one is the zoom position z1 (f=27.20 mm), and the lens diameter of the first lens unit L1 is determined near this focal length. The lens diameters of the third lens unit L3 and the fourth lens unit L4 are determined near the focal length at the fourth zoom position (f=340 mm).

The 15th, 23rd, and 28th lens surfaces are aspherical. The 15th lens surface mainly corrects distortion at the wide angle end, and the 23rd and 28th lens surfaces correct axial aberration such as comatic aberration at the wide angle end and spherical aberration at the telephoto end. FIGS. 6A, 6B, 6C, 6D, and 6E are aberration diagrams of the zoom lens of Numerical Embodiment 3 focused at infinity at the wide angle end, f=27.20 mm, f=100 mm, f=340 mm, and the telephoto end, respectively.

The zoom lens of Embodiment 3 satisfies Expressions (1) to (9), and thereby achieves a wide angle of view, a high magnification, high optical performance over the entire zoom range, and favorable zooming operability.

Embodiment 4

A zoom lens of Embodiment 4 of the present invention includes, in order from the object side, a first lens unit L1 having a positive refractive power configured not to move for zooming, a second lens unit L2 having a negative refractive power configured to move for zooming, a third lens unit L3 having a positive refractive power configured to move for zooming, a fourth lens unit L4 having a positive refractive power configured to move for zooming, and a fifth lens unit L5 having a positive refractive power configured not to move for zooming and configured to perform image formation.

The first lens unit L1 includes stationary lens units L11 and L13 configured not to move for focusing and a focus lens unit L12 configured to move to the image side for focusing from infinity to close-up. The zoom lens of Embodiment 4 performs zooming and correction of image plane variation caused by the zooming by causing the second lens unit L2 to the fourth lens unit L4 to move on the optical axis with the distances therebetween changing. These three lens units (the second lens unit L2 to the fourth lens unit L4) form the zooming system.

Figure 7:
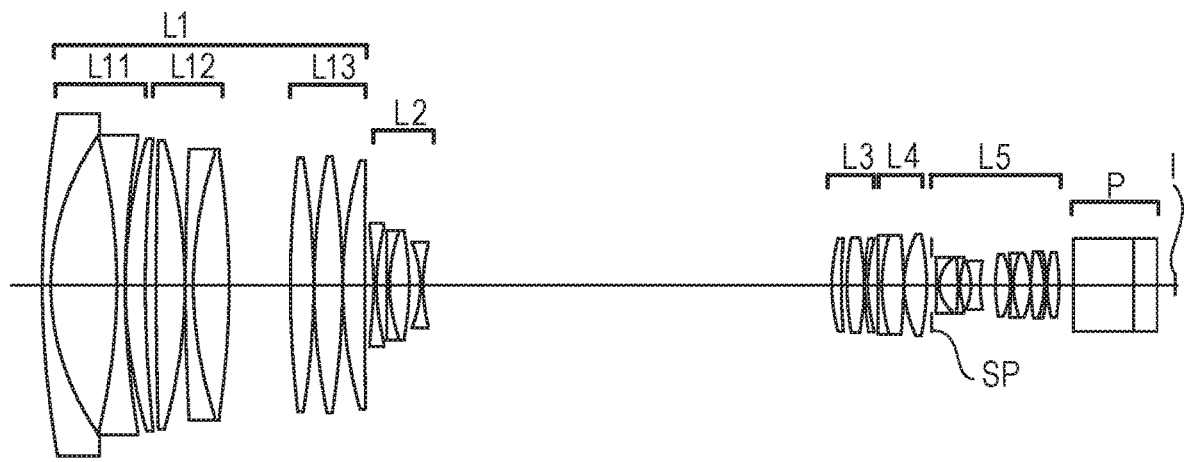
FIG. 7 is a lens sectional view of a zoom lens according to Numerical Embodiment 4 focused at infinity at the wide angle end.
Figure 8A:
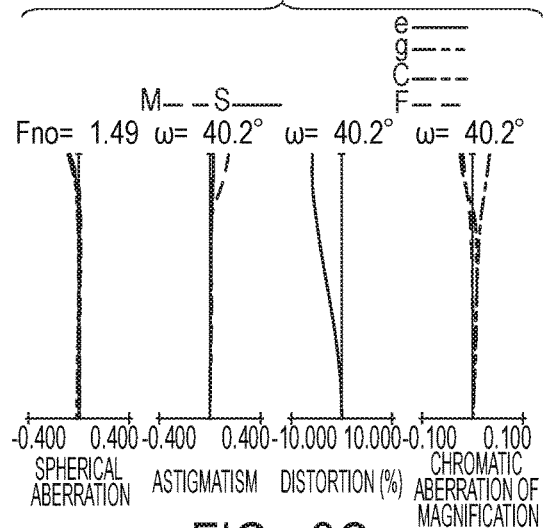
FIG. 8A is a longitudinal aberration diagram of the zoom lens according to Numerical Embodiment 4 focused at infinity at the wide angle end.
Figure 8B:
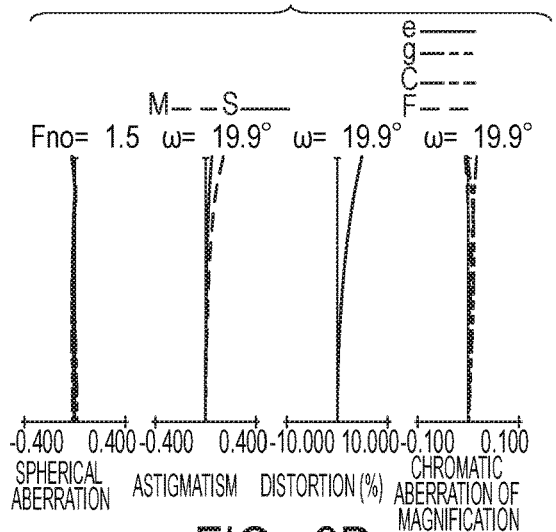
FIG. 8B is a longitudinal aberration diagram of the zoom lens according to Numerical Embodiment 4 focused at infinity at f=15.2 mm.
Figure 8C:
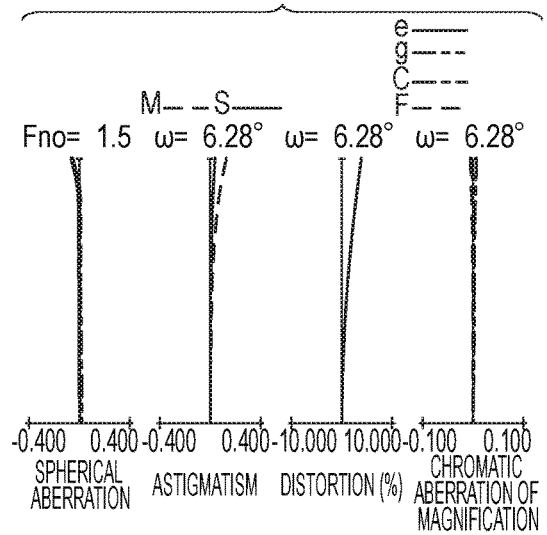
FIG. 8C is a longitudinal aberration diagram of the zoom lens according to Numerical Embodiment 4 focused at infinity at f=50 mm.
Figure 8D:
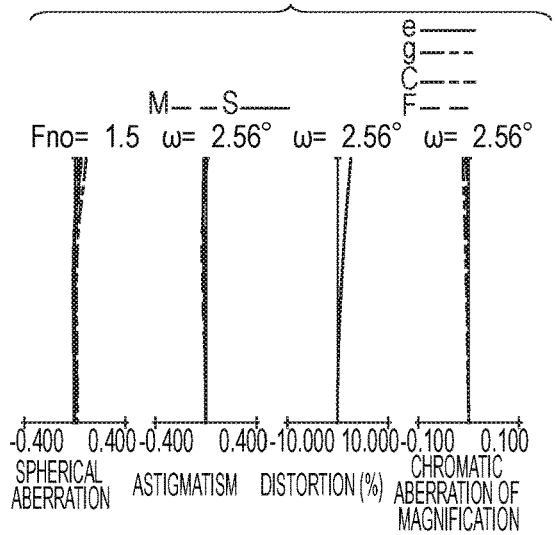
FIG. 8D is a longitudinal aberration diagram of the zoom lens according to Numerical Embodiment 4 focused at infinity at f=123 mm.
Figure 8E:
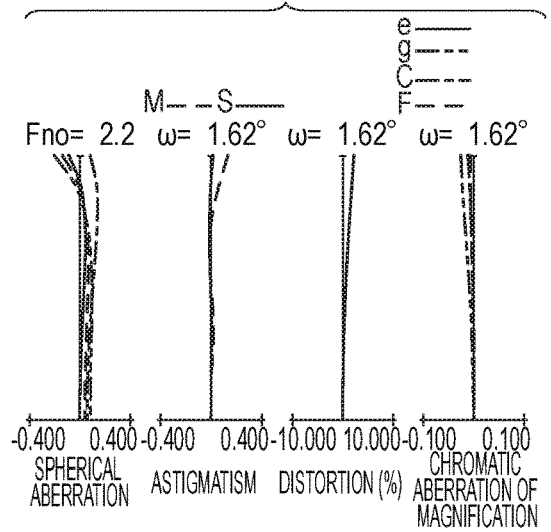
FIG. 8E is a longitudinal aberration diagram of the zoom lens according to Numerical Embodiment 4 focused at infinity at the telephoto end.

FIG. 7 is a lens sectional diagram of the zoom lens of Numerical Embodiment 4 of the present invention focused at infinity at the wide angle end (at a focal length of f=6.5 mm). In the zoom lens of Embodiment 4, the first lens unit L1 corresponds to the 1st to 17th lens surfaces. The second lens unit L2 corresponds to the 18th to 24th lens surfaces. The third lens unit L3 corresponds to the 25th to 30th lens surfaces. The fourth lens unit L4 corresponds to the 31st to 35th lens surfaces.

For zooming from the wide angle end to the telephoto end, the second lens unit L2 moves linearly to the image side, and meanwhile the third lens unit L3 and the fourth lens unit L4 move substantially from the image side to the object side while describing non-linear paths at a zoom middle position. The third lens unit L3 moves to the object side once near a zoom position z1 (f=27.20 mm) close to the wide angle end to correct aberration variation, and then moves substantially from the image side to the object side while describing non-linear paths.

Among the five zoom positions in Numerical Embodiment 4 to be shown later, the second one is the zoom position z1 (f=15.21 mm), and the lens diameter of the first lens unit L1 is determined near this focal length. The lens diameters of the third lens unit L3 and the fourth lens unit L4 are determined near the focal length at the fourth zoom position (f=123 mm).

The 18th, 26th, and 34th lens surfaces are aspherical. The 18th lens surface mainly corrects distortion at the wide angle end, and the 26th and 34th lens surfaces correct axial aberration such as comatic aberration at the wide angle end and spherical aberration at the telephoto end. FIGS. 8A, 8B, 8C, 8D, and 8E are aberration diagrams of the zoom lens of Numerical Embodiment 4 focused at infinity at the wide angle end, f=15.21 mm, f=50 mm, f=123 mm, and the telephoto end, respectively.

The zoom lens of Embodiment 4 satisfies Expressions (1) to (9), and thereby achieves a wide angle of view, a high magnification, high optical performance over the entire zoom range, and favorable zooming operability.

Embodiment 5

A zoom lens of Embodiment 5 of the present invention includes, in order from the object side, a first lens unit L1 having a positive refractive power configured not to move for zooming, a second lens unit L2 having a negative refractive power configured to move for zooming, a third lens unit L3 having a positive refractive power configured to move for zooming, a fourth lens unit L4 having a positive refractive power configured to move for zooming, and a fifth lens unit L5 having a positive refractive power configured not to move for zooming and configured to perform image formation.

The first lens unit L1 includes a stationary lens unit L11 configured not to move for focusing and a focus lens unit L12 configured to move to the object side for focusing from infinity to close-up. The second lens unit L2 is split into an L21 unit and an L22 unit and favorably corrects aberrations, mainly spherical aberration, at f=340 mm by changing the distance between them for zooming from the wide angle end to the telephoto end. The amounts of movement m2a and m2b of the L21 unit and the L22 unit from the wide angle end to the telephoto end are m2a=188.71 mm and m2b=188.50 mm. The zoom lens of Embodiment 5 performs zooming and correction of image plane variation caused by the zooming by causing the second lens unit L2 to the fourth lens unit L4 to move on the optical axis with the distances therebetween changing. These three lens units (the second lens unit L2 to the fourth lens unit L4) form the zooming system.

Figure 9:
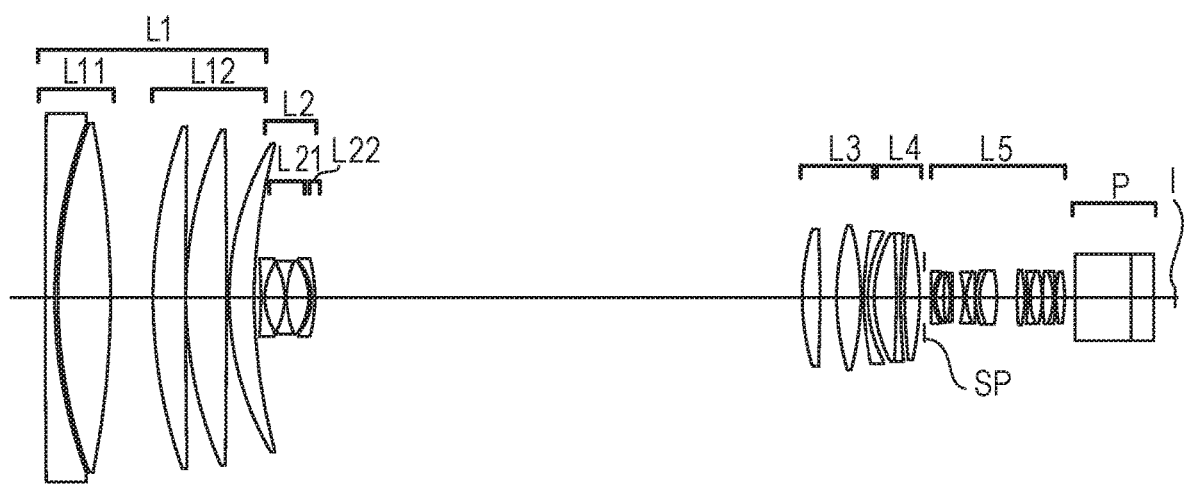
FIG. 9 is a lens sectional view of a zoom lens according to Numerical Embodiment 5 focused at infinity at the wide angle end.
Figure 10A:
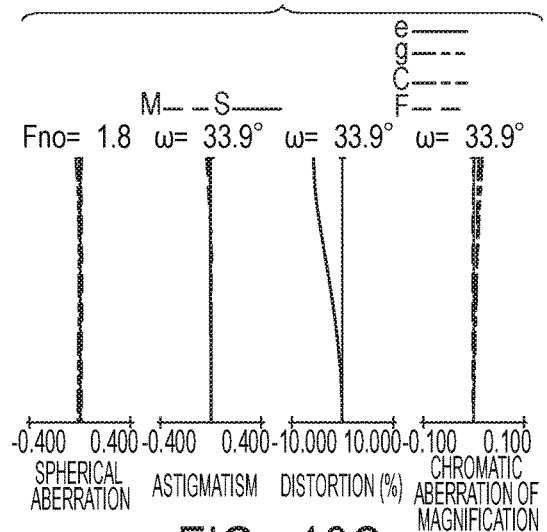
FIG. 10A is a longitudinal aberration diagram of the zoom lens according to Numerical Embodiment 5 focused at infinity at the wide angle end.
Figure 10B:
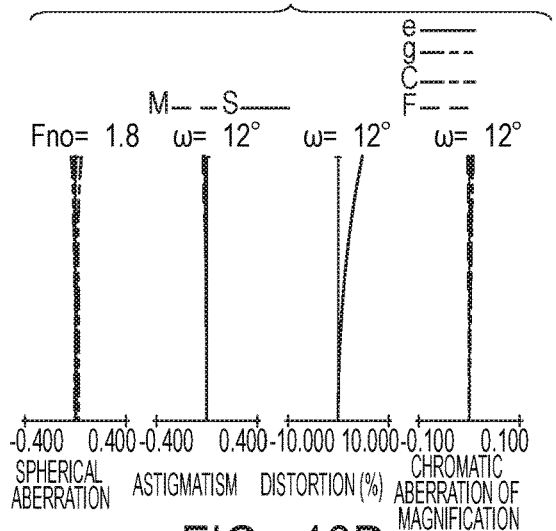
FIG. 10B is a longitudinal aberration diagram of the zoom lens according to Numerical Embodiment 5 focused at infinity at f=25.9 mm.
Figure 10C:
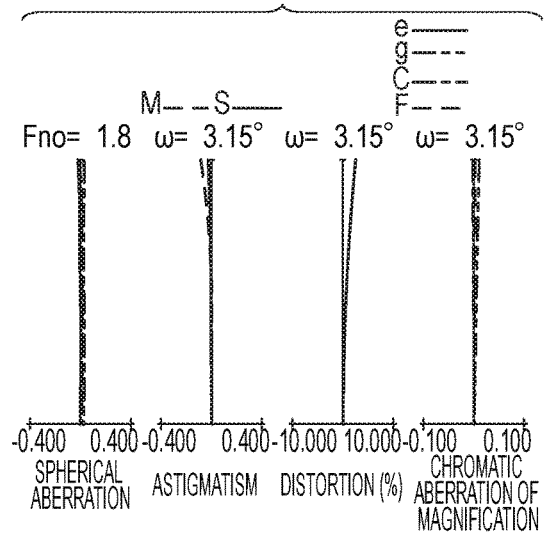
FIG. 10C is a longitudinal aberration diagram of the zoom lens according to Numerical Embodiment 5 focused at infinity at f=100 mm.
Figure 10D:
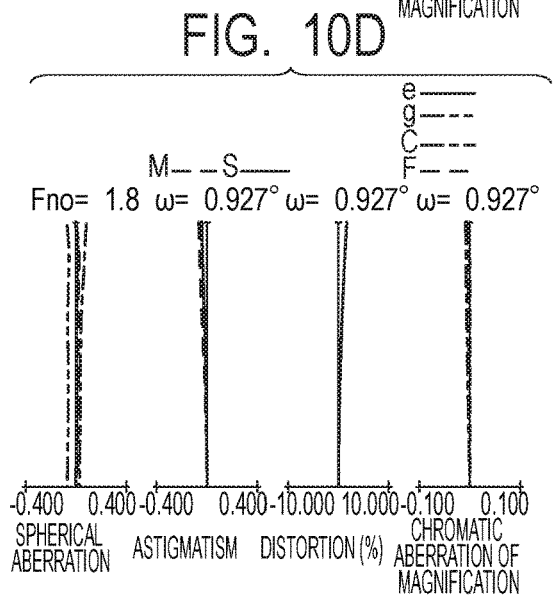
FIG. 10D is a longitudinal aberration diagram of the zoom lens according to Numerical Embodiment 5 focused at infinity at f=340 mm.
Figure 10E:
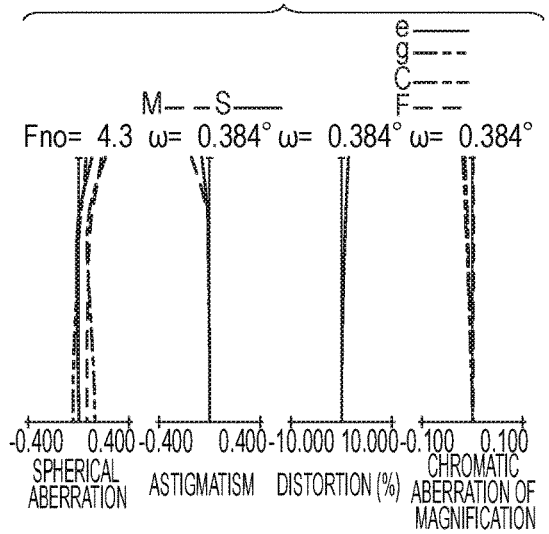
FIG. 10E is a longitudinal aberration diagram of the zoom lens according to Numerical Embodiment 5 focused at infinity at the telephoto end.

FIG. 9 is a lens sectional diagram of the zoom lens of Numerical Embodiment 5 of the present invention focused at infinity at the wide angle end (at a focal length of f=8.2 mm). In the zoom lens of Embodiment 5, the first lens unit L1 corresponds to the 1st to 10th lens surfaces. The second lens unit L2 corresponds to the 11th to 17th lens surfaces. The third lens unit L3 corresponds to the 18th to 23rd lens surfaces. The fourth lens unit L4 corresponds to the 24th to 28th lens surfaces.

For zooming from the wide angle end to the telephoto end, the L21 unit and the L22 unit in the second lens unit L2 move in such a manner that the distance between them widens near the zoom position of f=340 mm and narrows at the telephoto end. The third lens unit L3 and the fourth lens unit LA move substantially from the image side to the object side while describing non-linear paths at a zoom middle position. The third lens unit L3 moves to the object side once near a zoom position z1 (f=25.93 mm) close to the wide angle end to correct aberration variation, and then moves substantially from the image side to the object side while describing non-linear paths.

Among the five zoom positions in Numerical Embodiment 5 to be shown later, the second one is the zoom position z1 (f=25.93 mm), and the lens diameter of the first lens unit L1 is determined near this focal length. The lens diameters of the third lens unit L3 and the fourth lens unit L4 are determined near the focal length at the fourth zoom position (f=340 mm).

The 11th, 17th, 19th, and 27th lens surfaces are aspherical. The 11th lens surface mainly corrects distortion at the wide angle end, and the 17th, 19th, and 27th lens surfaces correct axial aberration such as comatic aberration at the wide angle end and spherical aberration at the telephoto end. FIGS. 10A, 10B, 10C, 10D, and 10E are aberration diagrams of the zoom lens of Numerical Embodiment 5 focused at infinity at the wide angle end, f=25.93 mm, f=100 mm, f=340 mm, and the telephoto end, respectively.

The zoom lens of Embodiment 5 satisfies Expressions (1) to (10), and thereby achieves a wide angle of view, a high magnification, high optical performance over the entire zoom range, and favorable zooming operability.

Embodiment 6

A zoom lens of Embodiment 6 of the present invention includes, in order from the object side, a first lens unit L1 having a positive refractive power configured not to move for zooming, a second lens unit L2 having a negative refractive power configured to move for zooming, a third lens unit L3 having a positive refractive power configured to move for zooming, a fourth lens unit L4 having a positive refractive power configured to move for zooming, and a fifth lens unit L5 having a positive refractive power configured not to move for zooming and configured to perform image formation.

The first lens unit L1 includes a stationary lens unit L11 configured not to move for focusing and a focus lens unit L12 configured to move to the object side for focusing from infinity to close-up. The zoom lens of Embodiment 6 performs zooming and correction of image plane variation caused by the zooming by causing the second lens unit L2 to the fourth lens unit L4 to move on the optical axis with the distances therebetween changing. These three lens units (the second lens unit L2 to the fourth lens unit L4) form the zooming system.

Figure 11:
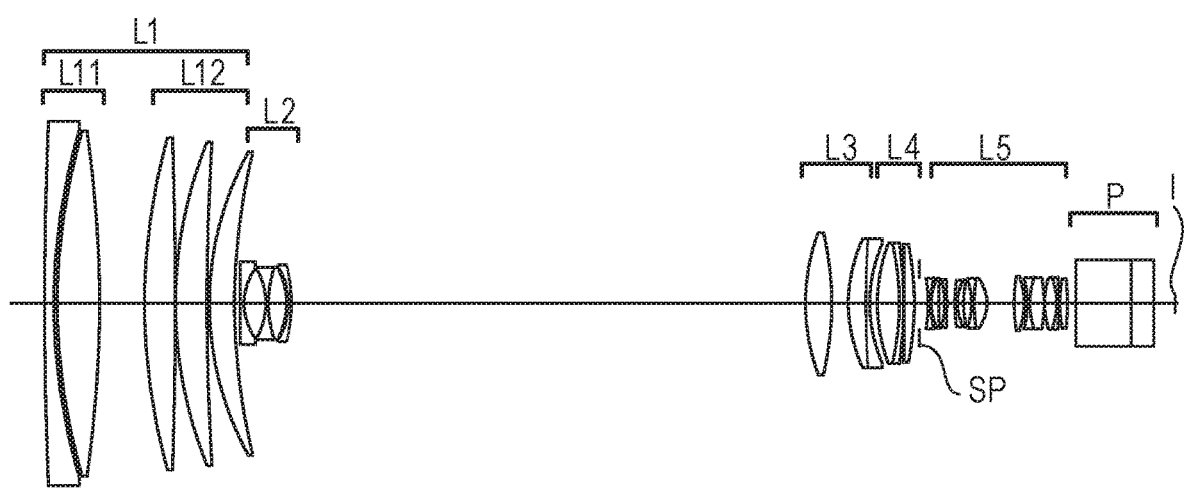
FIG. 11 is a lens sectional view of a zoom lens according to Numerical Embodiment 6 focused at infinity at the wide angle end.
Figure 12A:
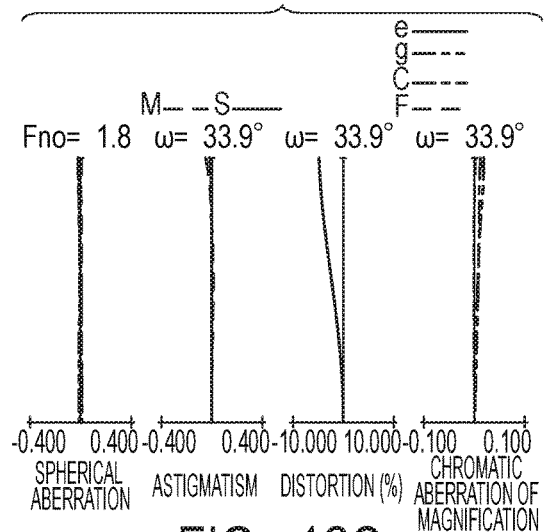
FIG. 12A is a longitudinal aberration diagram of the zoom lens according to Numerical Embodiment 6 focused at infinity at the wide angle end.
Figure 12B:
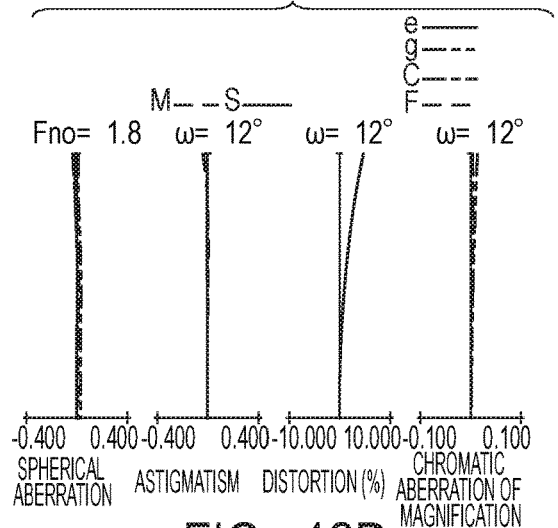
FIG. 12B is a longitudinal aberration diagram of the zoom lens according to Numerical Embodiment 6 focused at infinity at f=25.9 mm.
Figure 12C:
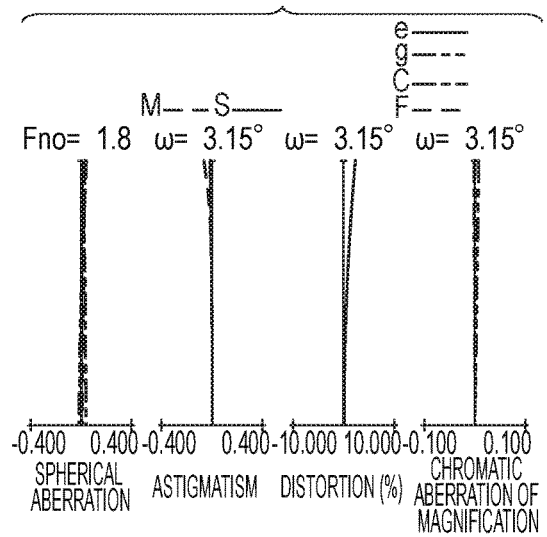
FIG. 12C is a longitudinal aberration diagram of the zoom lens according to Numerical Embodiment 6 focused at infinity at f=100 mm.
Figure 12D:
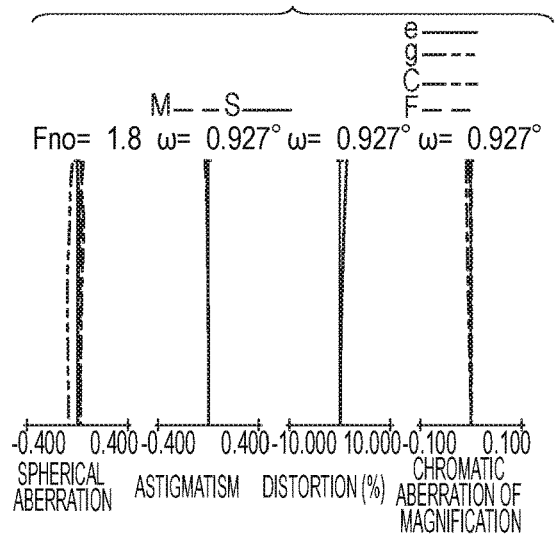
FIG. 12D is a longitudinal aberration diagram of the zoom lens according to Numerical Embodiment 6 focused at infinity at f=340 mm.
Figure 12E:
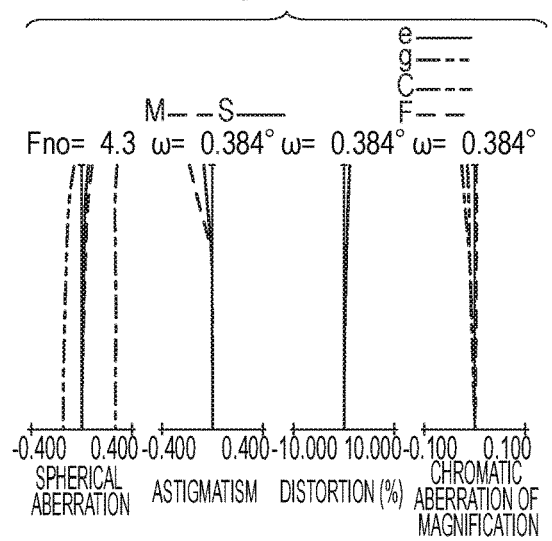
FIG. 12E is a longitudinal aberration diagram of the zoom lens according to Numerical Embodiment 6 focused at infinity at the telephoto end.

FIG. 11 is a lens sectional diagram of the zoom lens of Numerical Embodiment 6 of the present invention focused at infinity at the wide angle end (at a focal length of f=8.2 mm). In the zoom lens of Embodiment 6, the first lens unit L1 corresponds to the 1st to 10th lens surfaces. The second lens unit L2 corresponds to the 11th to 17th lens surfaces. The third lens unit L3 corresponds to the 18th to 22nd lens surfaces. The fourth lens unit L4 corresponds to the 23rd to 27th lens surfaces.

For zooming from the wide angle end to the telephoto end, the second lens unit L2 moves linearly to the image side, and meanwhile the third lens unit L3 and the fourth lens unit L4 move substantially from the image side to the object side while describing non-linear paths at a zoom middle position. The third lens unit L3 moves to the object side once near a zoom position z1 (f=25.93 mm) close to the wide angle end to correct aberration variation, and then moves substantially from the image side to the object side while describing non-linear paths.

Among the five zoom positions in Numerical Embodiment 6 to be shown later, the second one is the zoom position z1 (f=25.93 mm), and the lens diameter of the first lens unit L1 is determined near this focal length. The lens diameters of the third lens unit L3 and the fourth lens unit L4 are determined near the focal length at the fourth zoom position (f=340 mm).

The 11th, 19th, and 26th lens surfaces are aspherical. The 11th lens surface mainly corrects distortion at the wide angle end, and the 19th and 26th lens surfaces correct axial aberration such as comatic aberration at the wide angle end and spherical aberration at the telephoto end. FIGS. 12A, 12B, 12C, 12D, and 12E are aberration diagrams of the zoom lens of Numerical Embodiment 6 focused at infinity at the wide angle end, f=25.93 mm, f=100 mm, f=340 mm, and the telephoto end, respectively.

The zoom lens of Embodiment 6 satisfies Expressions (1) to (9), and thereby achieves a wide angle of view, a high magnification, high optical performance over the entire zoom range, and favorable zooming operability.

Although the preferred embodiments of the present invention have been described above, the present invention is not limited to those embodiments and is variously modifiable and changeable within the gist thereof.

Numerical Embodiment 1

| [Unit mm] | | | | |
|---|---|---|---|---|
| Surface data | | | | |
| Surface number | r | d | nd | vd |
| 1 | −2942.188 | 6.00 | 1.83481 | 42.7 |
| 2 | 335.459 | 1.80 | | |
| 3 | 335.066 | 23.71 | 1.43387 | 95.1 |
| 4 | −1057.929 | 0.20 | | |
| 5 | 525.299 | 14.68 | 1.43387 | 95.1 |
| 6 | −2449.905 | 25.25 | | |
| 7 | 377.042 | 20.53 | 1.43387 | 95.1 |
| 8 | −1365.497 | 0.25 | | |
| 9 | 306.954 | 16.16 | 1.43387 | 95.1 |
| 10 | 1716.232 | 1.50 | | |
| 11 | 188.244 | 16.19 | 1.43875 | 94.7 |
| 12 | 408.078 | (variable) | | |
| 13* | −532.824 | 2.20 | 2.00330 | 28.3 |
| 14 | 38.132 | 11.72 | | |
| 15 | −44.546 | 1.45 | 1.74320 | 49.3 |
| 16 | 72.565 | 9.77 | 1.89286 | 20.4 |
| 17 | −46.484 | 1.63 | | |
| 18 | −41.758 | 2.00 | 1.88300 | 40.8 |
| 19 | −152.608 | (variable) | | |
| 20 | 152.336 | 11.49 | 1.72916 | 54.7 |
| 21* | −265.715 | 6.62 | | |
| 22 | 139.888 | 13.50 | 1.43875 | 94.7 |
| 23 | −246.304 | 0.50 | | |
| 24 | 264.094 | 2.60 | 1.85478 | 24.8 |
| 25 | 97.106 | (variable) | | |
| 26 | 86.506 | 15.39 | 1.49700 | 81.5 |
| 27 | −236.969 | 0.50 | | |
| 28 | 415.877 | 2.50 | 1.80518 | 25.4 |
| 29 | 139.362 | 7.85 | 1.60311 | 60.6 |

[Unit mm]

| | | | | |
|---|---|---|---|---|
| 30* | −764.201 | (variable) | | |
| 31 (stop) | ∞ | 5.46 | | |
| 32 | −100.588 | 1.40 | 1.88300 | 40.8 |
| 33 | 50.285 | 1.36 | | |
| 34 | 40.817 | 3.60 | 1.92286 | 18.9 |
| 35 | 96.042 | 4.19 | | |
| 36 | −79.866 | 1.70 | 1.80400 | 46.5 |
| 37 | −114.439 | 7.69 | | |
| 38 | 447.233 | 1.50 | 1.80400 | 46.5 |
| 39 | 36.261 | 4.29 | 1.84666 | 23.9 |
| 40 | 154.673 | 4.71 | | |
| 41 | −40.896 | 1.50 | 1.89190 | 37.1 |
| 42 | 100.531 | 8.12 | 1.51633 | 64.1 |
| 43 | −29.819 | 12.96 | | |
| 44 | 95.109 | 5.83 | 1.51742 | 52.4 |
| 45 | −65.823 | 1.40 | | |
| 46 | −142.700 | 1.50 | 1.88300 | 40.8 |
| 47 | 37.951 | 7.64 | 1.48749 | 70.2 |
| 48 | −86.098 | 0.20 | | |
| 49 | 111.798 | 7.63 | 1.51742 | 52.4 |
| 50 | −35.378 | 1.50 | 1.88300 | 40.8 |
| 51 | −107.947 | 0.20 | | |
| 52 | 90.094 | 7.67 | 1.53996 | 59.5 |
| 53 | −53.741 | 10.00 | | |
| 54 | ∞ | 33.00 | 1.60859 | 46.4 |
| 55 | ∞ | 13.20 | 1.51633 | 64.2 |
| 56 | ∞ | 13.30 | | |
| Image plane | ∞ | | | |

Aspheric surface data

13th surface

K = 1.99852e+000
A4 = 1.15677e−006
A6 = −2.75064e−008
A8 = −3.06848e−010
A10 = 9.10515e−013
A12 = 3.28486e−015
A14 = 1.35261e−018
A16 = 5.54400e−022
A3 = 2.74335e−007
A5 = 9.95673e−008
A7 = 4.02226e−009
A9 = 6.12079e−012
A11 = −8.52506e−014
A13 = −6.85632e−017
A15 = −3.84859e−020

21th surface

K = 1.21093e+001
A4 = 2.82183e−007
A6 = −5.59441e−011
A8 = −2.00796e−014
A10 = 9.78964e−017
A12 = −6.30815e−020
A14 = 1.70834e−023
A16 = −4.73901e−027
A3 = −2.90901e−008
A5 = 1.58196e−009
A7 = 1.10620e−012
A9 = −1.50730e−015
A11 = 5.86871e−020
A13 = 1.04584e−022
A15 = 1.44467e−025

30th surface

K = −2.23400e+002
A4 = 2.77687e−007
A6 = 4.69555e−010
A8 = 1.39733e−013
A10 = −2.98156e−016
A12 = 4.58582e−019
A14 = −2.25443e−022
A16 = 5.80568e−026
A3 = 1.70768e−007

A5 = −5.73181e−009
A7 = −1.36230e−011
A9 = 7.92918e−015
A11 = −8.14405e−018
A13 = 2.06016e−021
A15 = −8.57551e−025

Various data
Zoom ratio 120.00

| Focal length | 8.50 | 28.13 | 100.00 | 340.00 | 1020.00 |
|---|---|---|---|---|---|
| F-number | 1.75 | 1.75 | 1.75 | 1.75 | 5.25 |
| Half angle of view (deg) | 32.91 | 11.06 | 3.15 | 0.93 | 0.31 |
| Image height | 5.50 | 5.50 | 5.50 | 5.50 | 5.50 |
| Total lens length | 677.55 | 677.55 | 677.55 | 677.55 | 677.55 |
| BF | 13.30 | 13.30 | 13.30 | 13.30 | 13.30 |
| d12 | 3.47 | 94.70 | 154.53 | 185.25 | 194.08 |
| d19 | 289.33 | 168.20 | 96.92 | 55.51 | 2.00 |
| d25 | 4.21 | 21.63 | 10.30 | 4.08 | 4.50 |
| d30 | 2.99 | 15.46 | 38.24 | 55.16 | 99.42 |
| d56 | 13.30 | 13.30 | 13.30 | 13.30 | 13.30 |
| Entrance pupil position | 133.62 | 390.98 | 1087.78 | 3488.85 | 14063.25 |
| Exit pupil position | 166.67 | 166.67 | 166.67 | 166.67 | 166.67 |
| Front principal point position | 142.60 | 424.28 | 1252.98 | 4582.56 | 21866.59 |
| Rear principal point position | 4.80 | −14.83 | −86.70 | −326.70 | −1006.70 |

Zoom lens unit data

| Unit | Start surface | Focal length | Lens structure length | Front principal point position | Rear principal point position |
|---|---|---|---|---|---|
| 1 | 1 | 251.50 | 126.27 | 72.69 | −19.27 |
| 2 | 13 | −24.07 | 28.78 | 3.62 | −16.98 |
| 3 | 20 | 134.62 | 34.71 | −5.03 | −27.55 |
| 4 | 26 | 112.37 | 26.24 | 4.27 | −13.07 |
| 5 | 31 | 42.11 | 148.25 | 58.68 | 17.53 |

Individual lens data

| Lens | Start surface | Focal length |
|---|---|---|
| 1 | 1 | −358.42 |
| 2 | 3 | 588.08 |
| 3 | 5 | 995.95 |
| 4 | 7 | 681.71 |
| 5 | 9 | 856.44 |
| 6 | 11 | 776.95 |
| 7 | 13 | −35.11 |
| 8 | 15 | −36.77 |
| 9 | 16 | 32.64 |
| 10 | 18 | −65.28 |
| 11 | 20 | 133.77 |
| 12 | 22 | 205.02 |
| 13 | 24 | −179.27 |
| 14 | 26 | 129.18 |
| 15 | 28 | −258.97 |
| 16 | 29 | 195.31 |
| 17 | 32 | −37.58 |
| 18 | 34 | 73.66 |
| 19 | 36 | −334.48 |
| 20 | 38 | −48.91 |
| 21 | 39 | 54.49 |
| 22 | 41 | −32.23 |
| 23 | 42 | 45.34 |
| 24 | 44 | 75.78 |
| 25 | 46 | −33.62 |
| 26 | 47 | 54.96 |
| 27 | 49 | 52.64 |
| 28 | 50 | −59.83 |
| 29 | 52 | 63.28 |

-continued

| [Unit mm] | | |
|---|---|---|
| 30 | 54 | 0.00 |
| 31 | 55 | 0.00 |

Numerical Embodiment 2

[Unit mm]

Surface data

| Surface number | r | d | nd | vd |
|---|---|---|---|---|
| 1 | 1278.530 | 5.50 | 1.83400 | 37.2 |
| 2 | 312.679 | 2.00 | | |
| 3 | 313.847 | 25.70 | 1.43387 | 95.1 |
| 4 | −941.282 | 24.86 | | |
| 5 | 340.139 | 18.51 | 1.43387 | 95.1 |
| 6 | −4448.281 | 0.11 | | |
| 7 | 249.595 | 19.33 | 1.43387 | 95.1 |
| 8 | 1753.032 | 1.50 | | |
| 9 | 186.464 | 15.29 | 1.43875 | 94.7 |
| 10 | 393.411 | (variable) | | |
| 11* | −366.661 | 2.20 | 2.00330 | 28.3 |
| 12 | 36.018 | 13.67 | | |
| 13 | −37.676 | 1.45 | 1.74951 | 35.3 |
| 14 | 85.698 | 10.52 | 1.92286 | 18.9 |
| 15 | −45.768 | 1.48 | | |
| 16 | −38.854 | 2.00 | 1.91650 | 31.6 |
| 17 | −69.497 | (variable) | | |
| 18 | 115.664 | 10.68 | 1.72916 | 54.7 |
| 19* | −794.336 | 9.75 | | |
| 20 | 215.319 | 10.55 | 1.49700 | 81.5 |
| 21 | −220.582 | 0.20 | | |
| 22 | 196.798 | 2.60 | 1.85478 | 24.8 |
| 23 | 83.688 | (variable) | | |
| 24 | 89.063 | 14.74 | 1.43875 | 94.7 |
| 25 | −193.667 | 2.50 | 1.85478 | 24.8 |
| 26 | −330.671 | 2.15 | | |
| 27* | −539.234 | 5.45 | 1.60311 | 60.6 |
| 28 | −164.580 | (variable) | | |
| 29(stop) | ∞ | 5.19 | | |
| 30 | −121.299 | 1.40 | 1.83481 | 42.7 |
| 31 | 62.904 | 0.50 | | |
| 32 | 39.779 | 5.02 | 1.80810 | 22.8 |
| 33 | −2286.796 | 3.41 | | |
| 34 | −62.539 | 1.40 | 1.88300 | 40.8 |
| 35 | −101.022 | 4.66 | | |
| 36 | −247.264 | 1.50 | 1.83481 | 42.7 |
| 37 | 54.704 | 2.39 | 1.72825 | 28.5 |
| 38 | 69.615 | 4.73 | | |
| 39 | −53.326 | 1.50 | 1.91650 | 31.6 |
| 40 | −72.915 | 4.44 | 1.51742 | 52.4 |
| 41 | −30.226 | 5.64 | | |
| 42 | −52.233 | 2.06 | 1.63980 | 34.5 |
| 43 | −55.982 | 1.70 | | |
| 44 | 504.705 | 1.50 | 1.88300 | 40.8 |
| 45 | 38.378 | 6.08 | 1.43875 | 94.7 |
| 46 | −110.391 | 0.20 | | |
| 47 | 58.919 | 7.58 | 1.51633 | 64.1 |
| 48 | −31.931 | 1.50 | 1.91650 | 31.6 |
| 49 | −85.507 | 0.20 | | |
| 50 | 89.707 | 5.31 | 1.58144 | 40.8 |
| 51 | −60.795 | 5.00 | | |
| 52 | ∞ | 33.00 | 1.60859 | 46.4 |
| 53 | ∞ | 13.20 | 1.51633 | 64.2 |
| 54 | ∞ | 13.29 | | |
| Image plane | ∞ | | | |

Aspheric surface data

11th surface

K = 0.00000e+000
A4 = 2.14525e−006

-continued

[Unit mm]

A6 = −1.14922e−009
A8 = 3.37674e−012
A10 = −1.44191e−014
A12 = 3.48099e−017
A14 = −4.20399e−020
A16 = 2.02538e−023

19th surface

K = 0.00000e+000
A4 = 2.46871e−007
A6 = 1.21262e−011
A8 = −4.96845e−014
A10 = 7.45438e−017
A12 = −5.84560e−020
A14 = 2.36171e−023
A16 = −3.88796e−027

27th surface

K = 0.00000e+000
A4 = −2.42211e−007
A6 = 5.25725e−011
A8 = −2.73066e−013
A10 = 7.22228e−016
A12 = −1.94127e−018
A14 = −8.12554e−022
A16 = 9.82588e−026
A13 = 7.16625e−020
A15 = −3.67644e−024

Various data
Zoom ratio 100.00

| | | | | | |
|---|---:|---:|---:|---:|---:|
| Focal length | 8.20 | 25.93 | 100.00 | 340.00 | 820.00 |
| F-number | 1.80 | 1.80 | 1.80 | 1.80 | 4.30 |
| Half angle of view (deg) | 33.85 | 11.98 | 3.15 | 0.93 | 0.38 |
| Image height | 5.50 | 5.50 | 5.50 | 5.50 | 5.50 |
| Total lens length | 652.41 | 652.41 | 652.41 | 652.41 | 652.41 |
| BF | 13.29 | 13.29 | 13.29 | 13.29 | 13.29 |
| d10 | 3.56 | 87.57 | 154.05 | 179.70 | 188.50 |
| d17 | 307.07 | 181.12 | 105.65 | 51.08 | 2.00 |
| d23 | 3.67 | 30.47 | 12.94 | 11.00 | 18.86 |
| d28 | 2.97 | 18.11 | 44.62 | 75.50 | 107.91 |
| d54 | 13.29 | 13.29 | 13.29 | 13.29 | 13.29 |
| Entrance pupil position | 129.20 | 367.69 | 1199.80 | 3676.66 | 11744.83 |
| Exit pupil position | −1371.45 | −1371.45 | −1371.45 | −1371.45 | −1371.45 |
| Front principal point position | 137.35 | 393.14 | 1292.58 | 3933.18 | 12079.26 |
| Rear principal point position | 5.09 | −12.64 | −86.71 | −326.71 | −806.71 |

Zoom lens unit data

| Unit | Start surface | Focal length | Lens structure length | Front principal point position | Rear principal point position |
|---:|---:|---:|---:|---:|---:|
| 1 | 1 | 250.55 | 112.79 | 61.11 | −23.71 |
| 2 | 11 | −26.23 | 31.32 | 1.62 | −23.00 |
| 3 | 18 | 154.35 | 33.78 | −8.20 | −30.49 |
| 4 | 24 | 130.44 | 24.85 | 7.26 | −10.49 |
| 5 | 29 | 63.58 | 119.12 | 60.77 | 5.04 |

Individual lens data

| Lens | Start surface | Focal length |
|---:|---:|---:|
| 1 | 1 | −494.42 |
| 2 | 3 | 544.51 |
| 3 | 5 | 727.30 |
| 4 | 7 | 666.50 |
| 5 | 9 | 788.10 |
| 6 | 11 | −32.33 |
| 7 | 13 | −34.51 |
| 8 | 14 | 33.22 |
| 9 | 16 | −98.52 |
| 10 | 18 | 138.55 |

-continued

| [Unit mm] | | |
|---|---|---|
| 11 | 20 | 220.37 |
| 12 | 22 | −170.56 |
| 13 | 24 | 140.94 |
| 14 | 25 | −546.31 |
| 15 | 27 | 389.09 |
| 16 | 30 | −49.17 |
| 17 | 32 | 47.94 |
| 18 | 34 | −188.06 |
| 19 | 36 | −53.24 |
| 20 | 37 | 325.69 |
| 21 | 39 | −223.17 |
| 22 | 40 | 95.92 |
| 23 | 42 | −1543.68 |
| 24 | 44 | −46.84 |
| 25 | 45 | 65.56 |
| 26 | 47 | 41.13 |
| 27 | 48 | −55.94 |
| 28 | 50 | 62.78 |
| 29 | 52 | 0.00 |
| 30 | 53 | 0.00 |

Numerical Embodiment 3

| [Unit mm] | | | |
|---|---|---|---|
| Surface data | | | |
| Surface number | r | d | nd | vd |
|---|---|---|---|---|
| 1 | −3617.003 | 6.00 | 1.77250 | 49.6 |
| 2 | 378.684 | 2.23 | | |
| 3 | 405.889 | 22.86 | 1.43387 | 95.1 |
| 4 | −1282.316 | 0.20 | | |
| 5 | 1317.930 | 6.00 | 1.83400 | 37.2 |
| 6 | 558.265 | 1.50 | | |
| 7 | 429.895 | 23.76 | 1.43387 | 95.1 |
| 8 | −827.583 | 25.35 | | |
| 9 | 409.548 | 21.66 | 1.43387 | 95.1 |
| 10 | −1037.829 | 0.25 | | |
| 11 | 259.781 | 19.02 | 1.43387 | 95.1 |
| 12 | 1228.124 | 1.50 | | |
| 13 | 185.727 | 15.44 | 1.43875 | 94.7 |
| 14 | 350.267 | (variable) | | |
| 15* | −172.526 | 2.20 | 1.95375 | 32.3 |
| 16 | 42.749 | 10.10 | | |
| 17 | −52.460 | 1.45 | 1.81600 | 46.6 |
| 18 | 55.395 | 12.02 | 1.80810 | 22.8 |
| 19 | −37.896 | 0.80 | | |
| 20 | −35.733 | 1.80 | 1.88300 | 40.8 |
| 21 | −113.585 | (variable) | | |
| 22 | 138.920 | 11.86 | 1.60311 | 60.6 |
| 23* | −241.742 | 0.50 | | |
| 24 | 281.206 | 11.66 | 1.53775 | 74.7 |
| 25 | −152.264 | 0.20 | | |
| 26 | −394.240 | 2.70 | 1.91650 | 31.6 |
| 27 | 239.547 | (variable) | | |
| 28* | 156.554 | 10.38 | 1.69680 | 55.5 |
| 29 | −286.500 | 0.20 | | |
| 30 | 132.269 | 2.70 | 1.85478 | 24.8 |
| 31 | 72.022 | 14.34 | 1.49700 | 81.5 |
| 32 | −387.487 | (variable) | | |
| 33(stop) | ∞ | 5.31 | | |
| 34 | −129.921 | 1.40 | 1.81600 | 46.6 |
| 35 | 49.359 | 1.16 | | |
| 36 | 39.074 | 6.11 | 1.80810 | 22.8 |
| 37 | −474.832 | 4.10 | | |
| 38 | −62.431 | 1.40 | 1.88300 | 40.8 |
| 39 | 289.603 | 8.80 | | |
| 40 | −865.664 | 1.50 | 1.72916 | 54.7 |
| 41 | 65.387 | 4.28 | | |
| 42 | 195.085 | 3.25 | 1.63980 | 34.5 |
| 43 | −1211.100 | 5.64 | | |
| 44 | −178.966 | 6.09 | 1.54814 | 45.8 |

-continued

| [Unit mm] | | | | |
|---|---|---|---|---|
| 45 | −37.844 | 1.70 | | |
| 46 | −156.436 | 1.50 | 1.88300 | 40.8 |
| 47 | 37.026 | 9.28 | 1.48749 | 70.2 |
| 48 | −56.506 | 0.20 | | |
| 49 | 186.143 | 7.58 | 1.49700 | 81.5 |
| 50 | −33.563 | 1.50 | 1.91082 | 35.3 |
| 51 | −82.365 | 0.20 | | |
| 52 | 87.446 | 7.84 | 1.51742 | 52.4 |
| 53 | −47.375 | 10.00 | | |
| 54 | ∞ | 33.00 | 1.60859 | 46.4 |
| 55 | ∞ | 13.20 | 1.51633 | 64.2 |
| 56 | ∞ | 13.27 | | |
| Image plane | ∞ | | | |

Aspheric surface data

15th surface $K = 0.00000e+000$
$A4 = 2.13050e-006$
$A6 = -1.07468e-009$
$A8 = 3.52332e-012$
$A10 = -1.62648e-014$
$A12 = 4.41300e-017$
$A14 = -6.12921e-020$
$A16 = 3.38323e-023$ 23th surface $K = 0.00000e+000$
$A4 = 2.65731e-007$
$A6 = 8.73889e-013$
$A8 = 9.53629e-016$
$A10 = 1.79718e-018$
$A12 = -6.22792e-022$ 28th surface $K = 0.00000e+000$
$A4 = -1.43773e-007$
$A6 = -4.20671e-012$
$A8 = -7.49249e-015$
$A10 = 6.99021e-018$
$A12 = -1.75185e-021$ Various data
Zoom ratio 110.00

| Focal length | 8.40 | 27.20 | 100.00 | 340.00 | 924.00 |
|---|---|---|---|---|---|
| F-number | 1.70 | 1.70 | 1.70 | 1.70 | 4.62 |
| Half angle of view (deg) | 33.22 | 11.43 | 3.15 | 0.93 | 0.34 |
| Image height | 5.50 | 5.50 | 5.50 | 5.50 | 5.50 |
| Total lens length | 680.00 | 680.00 | 680.00 | 680.00 | 680.00 |
| BF | 13.27 | 13.27 | 13.27 | 13.27 | 13.27 |
| d14 | 4.24 | 93.54 | 159.76 | 190.32 | 198.19 |
| d21 | 286.32 | 162.28 | 95.64 | 54.37 | 2.00 |
| d27 | 9.46 | 30.22 | 10.08 | 6.04 | 11.39 |
| d32 | 3.00 | 16.97 | 37.55 | 52.28 | 91.43 |
| d56 | 13.27 | 13.27 | 13.27 | 13.27 | 13.27 |
| Entrance pupil position | 145.30 | 386.17 | 1132.81 | 3519.68 | 11516.47 |
| Exit pupil position | 350.82 | 350.82 | 350.82 | 350.82 | 350.82 |
| Front principal point position | 153.91 | 415.56 | 1262.43 | 4202.15 | 14969.82 |
| Rear principal point position | 4.87 | −13.93 | −86.73 | −326.73 | −910.73 |

Zoom lens unit data

| Unit | Start surface | Focal length | Lens structure length | Front principal point position | Rear principal point position |
|---|---|---|---|---|---|
| 1 | 1 | 254.46 | 145.77 | 85.59 | −18.30 |
| 2 | 15 | −24.52 | 28.37 | 2.80 | −17.46 |
| 3 | 22 | 158.38 | 26.92 | −2.05 | −18.52 |
| 4 | 28 | 105.42 | 27.62 | 4.13 | −13.47 |
| 5 | 33 | 52.94 | 135.03 | 62.91 | 16.82 |

-continued

| [Unit mm] | | |
|---|---|---|
| Individual lens data | | |
| Lens | Start surface | Focal length |
| 1 | 1 | −441.34 |
| 2 | 3 | 711.73 |
| 3 | 5 | −1158.11 |
| 4 | 7 | 654.21 |
| 5 | 9 | 678.23 |
| 6 | 11 | 752.99 |
| 7 | 13 | 873.81 |
| 8 | 15 | −35.48 |
| 9 | 17 | −32.65 |
| 10 | 18 | 29.26 |
| 11 | 20 | −59.34 |
| 12 | 22 | 147.44 |
| 13 | 24 | 184.85 |
| 14 | 26 | −161.05 |
| 15 | 28 | 146.08 |
| 16 | 30 | −187.13 |
| 17 | 31 | 123.12 |
| 18 | 34 | −43.46 |
| 19 | 36 | 44.46 |
| 20 | 38 | −57.72 |
| 21 | 40 | −82.96 |
| 22 | 42 | 261.06 |
| 23 | 44 | 85.79 |
| 24 | 46 | −33.59 |
| 25 | 47 | 47.27 |
| 26 | 49 | 57.71 |
| 27 | 50 | −62.70 |
| 28 | 52 | 60.32 |
| 29 | 54 | 0.00 |
| 30 | 55 | 0.00 |

Numerical Embodiment 4

| [Unit mm] | | | | |
|---|---|---|---|---|
| Surface data | | | | |
| Surface number | r | d | nd | vd |
| 1 | 529.653 | 4.70 | 1.77250 | 49.6 |
| 2 | 142.745 | 36.35 | | |
| 3 | −333.913 | 4.50 | 1.77250 | 49.6 |
| 4 | 470.743 | 0.15 | | |
| 5 | 282.674 | 10.98 | 1.71736 | 29.5 |
| 6 | 739.309 | 5.96 | | |
| 7 | 2578.600 | 15.90 | 1.49700 | 81.5 |
| 8 | −286.756 | 0.20 | | |
| 9 | 1350.985 | 4.40 | 1.80518 | 25.4 |
| 10 | 227.973 | 19.77 | 1.49700 | 81.5 |
| 11 | −471.292 | 34.00 | | |
| 12 | 596.741 | 12.89 | 1.49700 | 81.5 |
| 13 | −427.165 | 0.15 | | |
| 14 | 350.787 | 15.65 | 1.49700 | 81.5 |
| 15 | −444.936 | 0.15 | | |
| 16 | 252.133 | 12.09 | 1.62041 | 60.3 |
| 17 | 5732.489 | (variable) | | |
| 18* | −138.580 | 1.50 | 1.77250 | 49.6 |
| 19 | 124.082 | 5.64 | | |
| 20 | −6027.878 | 1.50 | 1.89190 | 37.1 |
| 21 | 84.159 | 10.92 | 1.92286 | 18.9 |
| 22 | −144.773 | 6.11 | | |
| 23 | −60.663 | 1.50 | 1.81600 | 46.6 |
| 24 | 91.640 | (variable) | | |
| 25 | 95.402 | 5.31 | 1.69680 | 55.5 |
| 26* | 364.901 | 3.00 | | |
| 27 | 138.538 | 9.66 | 1.43875 | 94.7 |
| 28 | −132.778 | 0.20 | | |
| 29 | 149.290 | 2.00 | 1.84666 | 23.8 |
| 30 | 90.250 | (variable) | | |

-continued

| [Unit mm] | | | | |
|---|---|---|---|---|
| 31 | 83324.551 | 2.00 | 1.85478 | 24.8 |
| 32 | 93.582 | 11.98 | 1.48749 | 70.2 |
| 33 | −261.931 | 0.15 | | |
| 34* | 57.024 | 12.55 | 1.62041 | 60.3 |
| 35 | −128.392 | (variable) | | |
| 36(stop) | ∞ | 2.98 | | |
| 37 | −270.311 | 1.40 | 1.78800 | 47.4 |
| 38 | 17.849 | 10.14 | 1.84666 | 23.8 |
| 39 | −186.644 | 1.40 | 1.78800 | 47.4 |
| 40 | 43.120 | 5.93 | | |
| 41 | −31.688 | 5.03 | 1.77250 | 49.6 |
| 42 | 67.022 | 8.40 | | |
| 43 | 86.298 | 8.27 | 1.53775 | 74.7 |
| 44 | −38.699 | 0.20 | | |
| 45 | −231.336 | 1.50 | 2.00100 | 29.1 |
| 46 | 50.604 | 9.39 | 1.49700 | 81.5 |
| 47 | −44.994 | 0.20 | | |
| 48 | 127.198 | 7.32 | 1.49700 | 81.5 |
| 49 | −50.000 | 1.50 | 2.00100 | 29.1 |
| 50 | −77.032 | 0.20 | | |
| 51 | 73.468 | 6.55 | 1.64000 | 60.1 |
| 52 | −101.170 | 8.00 | | |
| 53 | ∞ | 33.00 | 1.60859 | 46.4 |
| 54 | ∞ | 13.20 | 1.51633 | 64.2 |
| 55 | ∞ | 10.00 | | |
| Image plane | ∞ | | | |

Aspheric surface data

18th surface $K = 0.00000e+000$
$A4 = 1.67476e-006$
$A6 = -1.79729e-010$
$A8 = 3.27393e-015$ 26th surface $K = 0.00000e+000$
$A4 = 3.97428e-007$
$A6 = 7.82036e-011$
$A8 = -1.44733e-014$ 34th surface $K = 0.00000e+000$
$A4 = -1.02916e-006$
$A6 = -1.66514e-010$
$A8 = -2.92848e-014$ Various data
Zoom ratio 30.00

| Focal length | 6.50 | 15.21 | 50.00 | 123.00 | 195.00 |
|---|---|---|---|---|---|
| F-number | 1.49 | 1.50 | 1.50 | 1.50 | 2.20 |
| Half angle of view (deg) | 40.24 | 19.88 | 6.28 | 2.56 | 1.62 |
| Image height | 5.50 | 5.50 | 5.50 | 5.50 | 5.50 |
| Total lens length | 625.00 | 625.00 | 625.00 | 625.00 | 625.00 |
| BF | 10.00 | 10.00 | 10.00 | 10.00 | 10.00 |
| d17 | 5.00 | 48.07 | 114.24 | 145.96 | 156.30 |
| d24 | 225.24 | 136.32 | 60.83 | 26.30 | 2.09 |
| d30 | 5.81 | 46.21 | 39.46 | 36.12 | 49.40 |
| d35 | 2.50 | 7.94 | 24.01 | 30.15 | 30.76 |
| d55 | 10.00 | 10.00 | 10.00 | 10.00 | 10.00 |
| Entrance pupil position | 115.81 | 160.23 | 354.27 | 792.60 | 1357.46 |
| Exit pupil position | 146.13 | 146.13 | 146.13 | 146.13 | 146.13 |
| Front principal point position | 122.62 | 177.14 | 422.63 | 1026.74 | 1831.79 |
| Rear principal point position | 3.50 | −5.21 | −40.00 | −113.00 | −185.00 |

-continued

[Unit mm]

Zoom lens unit data

| Unit | Start surface | Focal length | Lens structure length | Front principal point position | Rear principal point position |
|---|---|---|---|---|---|
| 1 | 1 | 148.73 | 177.83 | 135.95 | 68.90 |
| 2 | 18 | −32.61 | 27.17 | 11.28 | −6.15 |
| 3 | 25 | 120.51 | 20.17 | −0.20 | −14.06 |
| 4 | 31 | 72.12 | 26.68 | 13.90 | −2.79 |
| 5 | 36 | 34.60 | 124.60 | 46.37 | 9.86 |

Individual lens data

| Lens | Start surface | Focal length |
|---|---|---|
| 1 | 1 | −253.09 |
| 2 | 3 | −251.05 |
| 3 | 5 | 626.59 |
| 4 | 7 | 518.67 |
| 5 | 9 | −338.07 |
| 6 | 10 | 311.18 |
| 7 | 12 | 501.56 |
| 8 | 14 | 396.10 |
| 9 | 16 | 423.06 |
| 10 | 18 | −84.13 |
| 11 | 20 | −92.46 |
| 12 | 21 | 58.31 |
| 13 | 23 | −44.31 |
| 14 | 25 | 183.11 |
| 15 | 27 | 155.83 |
| 16 | 29 | −271.13 |
| 17 | 31 | −108.33 |
| 18 | 32 | 142.53 |
| 19 | 34 | 65.09 |
| 20 | 37 | −21.10 |
| 21 | 38 | 19.50 |
| 22 | 39 | −44.11 |
| 23 | 41 | −27.12 |
| 24 | 43 | 50.70 |
| 25 | 45 | −41.04 |
| 26 | 46 | 49.40 |
| 27 | 48 | 73.01 |
| 28 | 49 | −145.24 |
| 29 | 51 | 67.22 |
| 30 | 53 | 0.00 |
| 31 | 54 | 0.00 |

Numerical Embodiment 5

[Unit mm]

Surface data

| Surface number | r | d | nd | vd |
|---|---|---|---|---|
| 1 | 8902.108 | 5.50 | 1.83481 | 42.7 |
| 2 | 293.031 | 2.00 | | |
| 3 | 299.654 | 31.11 | 1.43387 | 95.1 |
| 4 | −514.323 | 24.93 | | |
| 5 | 303.463 | 19.33 | 1.43387 | 95.1 |
| 6 | 6129.826 | 0.11 | | |
| 7 | 247.810 | 24.00 | 1.43387 | 95.1 |
| 8 | −7103.045 | 1.50 | | |
| 9 | 181.463 | 14.73 | 1.43875 | 94.7 |
| 10 | 337.177 | (variable) | | |
| 11* | −189.283 | 2.20 | 2.00330 | 28.3 |
| 12 | 37.392 | 11.68 | | |
| 13 | −43.412 | 1.45 | 1.80000 | 29.8 |
| 14 | 53.807 | 13.14 | 1.89286 | 20.4 |
| 15 | −37.787 | (variable) | | |
| 16 | −33.150 | 2.00 | 1.81600 | 46.6 |
| 17* | −95.423 | (variable) | | |
| 18 | 138.006 | 10.59 | 1.72916 | 54.7 |

-continued

| [Unit mm] | | | | |
|---|---|---|---|---|
| 19* | −541.134 | 9.75 | | |
| 20 | 147.036 | 14.32 | 1.49700 | 81.5 |
| 21 | −160.091 | 1.73 | | |
| 22 | 173.675 | 2.60 | 1.85478 | 24.8 |
| 23 | 80.581 | (variable) | | |
| 24 | 79.073 | 13.02 | 1.43875 | 94.7 |
| 25 | −620.461 | 2.50 | 1.85478 | 24.8 |
| 26 | 399.958 | 2.39 | | |
| 27* | 249.933 | 8.86 | 1.60311 | 60.6 |
| 28 | −170.411 | (variable) | | |
| 29(stop) | ∞ | 3.71 | | |
| 30 | 449.878 | 1.40 | 1.83481 | 42.7 |
| 31 | 27.895 | 1.61 | | |
| 32 | 28.611 | 4.45 | 1.80810 | 22.8 |
| 33 | 97.758 | 3.91 | | |
| 34 | −69.884 | 1.40 | 1.88300 | 40.8 |
| 35 | −746.850 | 6.60 | | |
| 36 | −54.726 | 1.50 | 1.83481 | 42.7 |
| 37 | 35.393 | 5.14 | 1.72825 | 28.5 |
| 38 | −2426.736 | 0.20 | | |
| 39 | 45.076 | 2.50 | 2.00100 | 29.1 |
| 40 | 33.751 | 10.15 | 1.51742 | 52.4 |
| 41 | −79.544 | 12.06 | | |
| 42 | 203.499 | 4.46 | 1.54814 | 45.8 |
| 43 | −71.346 | 1.70 | | |
| 44 | −180.657 | 1.50 | 1.88300 | 40.8 |
| 45 | 41.688 | 7.00 | 1.43875 | 94.7 |
| 46 | −62.169 | 0.20 | | |
| 47 | 109.040 | 6.46 | 1.51633 | 64.1 |
| 48 | −38.028 | 1.50 | 1.91650 | 31.6 |
| 49 | −95.371 | 0.20 | | |
| 50 | 93.456 | 5.02 | 1.58144 | 40.8 |
| 51 | −76.830 | 6.15 | | |
| 52 | ∞ | 33.00 | 1.60859 | 46.4 |
| 53 | ∞ | 13.20 | 1.51633 | 64.2 |
| 54 | ∞ | 13.30 | | |
| Image plane | ∞ | | | |

| Aspheric surface data |
|---|
| 11th surface |

K = 0.00000e+000
A4 = 2.28615e−006
A6 = −1.38289e−009
A8 = 7.22628e−012
A10 = −4.35752e−014
A12 = 1.34169e−016
A14 = −1.96183e−019
A16 = 1.10092e−022

17th surface

K = 0.00000e+000
A4 = −1.76959e−007
A6 = −1.58573e−010
A8 = 2.80712e−013
A10 = −2.98755e−017
A12 = −3.73787e−018
A14 = 9.74883e−021
A16 = −7.35536e−024

19th surface

K = 0.00000e+000
A4 = 2.97276e−007
A6 = 2.55441e−012
A8 = −7.60558e−015
A10 = 3.19715e−017
A12 = −3.61423e−020
A14 = 1.79078e−023
A16 = −3.33963e−027

27th surface

K = 0.00000e+000
A4 = −3.10347e−007
A6 = 2.06311e−011
A8 = −2.66872e−013
A10 = 9.66509e−016

-continued

[Unit mm]

A12 = −3.30933e−018
A14 = −2.42884e−021
A16 = 2.13705e−026
A13 = 1.43782e−019
A15 = 1.37717e−023

Various data
Zoom ratio 100.00

| | | | | | |
|---|---|---|---|---|---|
| Focal length | 8.20 | 25.93 | 100.00 | 340.00 | 820.00 |
| F-number | 1.80 | 1.80 | 1.80 | 1.80 | 4.30 |
| Half angle of view (deg) | 33.85 | 11.98 | 3.15 | 0.93 | 0.38 |
| Image height | 5.50 | 5.50 | 5.50 | 5.50 | 5.50 |
| Total lens length | 668.32 | 668.32 | 668.32 | 668.32 | 668.32 |
| BF | 13.30 | 13.30 | 13.30 | 13.30 | 13.30 |
| d10 | 4.14 | 96.85 | 158.05 | 184.66 | 192.85 |
| d15 | 1.71 | 1.49 | 4.89 | 3.13 | 1.49 |
| d17 | 287.83 | 173.30 | 93.94 | 46.23 | 3.22 |
| d23 | 3.91 | 14.77 | 6.06 | 5.93 | 10.25 |
| d28 | 2.99 | 14.17 | 37.63 | 60.63 | 92.77 |
| d54 | 13.30 | 13.30 | 13.30 | 13.30 | 13.30 |
| Entrance pupil position | 129.39 | 391.90 | 1177.73 | 3592.39 | 10887.10 |
| Exit pupil position | 309.41 | 309.41 | 309.41 | 309.41 | 309.41 |
| Front principal point position | 137.82 | 420.10 | 1311.50 | 4322.78 | 13977.89 |
| Rear principal point position | 5.10 | −12.63 | −86.70 | −326.70 | −806.70 |

Zoom lens unit data

| Unit | Start surface | Focal length | Lens structure length | Front principal point position | Rear principal point position |
|---|---|---|---|---|---|
| 1 | 1 | 248.63 | 123.21 | 70.92 | −18.50 |
| 21 | 11 | −81.40 | 28.47 | −24.10 | −66.55 |
| 22 | 16 | −62.84 | 2.00 | −0.59 | −1.71 |
| 2 | 11 | −24.14 | 32.17 | 1.90 | −21.78 |
| 3 | 18 | 126.42 | 38.99 | −2.87 | −29.45 |
| 4 | 24 | 119.42 | 26.76 | 8.09 | −11.00 |
| 5 | 29 | 47.94 | 135.02 | 57.30 | 15.99 |

Individual lens data

| Lens | Start surface | Focal length |
|---|---|---|
| 1 | 1 | −361.06 |
| 2 | 3 | 440.41 |
| 3 | 5 | 733.28 |
| 4 | 7 | 551.07 |
| 5 | 9 | 868.22 |
| 6 | 11 | −30.71 |
| 7 | 13 | −29.60 |
| 8 | 14 | 26.37 |
| 9 | 16 | −62.84 |
| 10 | 18 | 151.15 |
| 11 | 20 | 156.18 |
| 12 | 22 | −176.50 |
| 13 | 24 | 160.36 |
| 14 | 25 | −281.51 |
| 15 | 27 | 168.69 |
| 16 | 30 | −35.48 |
| 17 | 32 | 48.15 |
| 18 | 34 | −86.89 |
| 19 | 36 | −25.41 |
| 20 | 37 | 47.55 |
| 21 | 39 | −149.71 |
| 22 | 40 | 47.03 |
| 23 | 42 | 96.43 |
| 24 | 44 | −38.02 |
| 25 | 45 | 57.93 |
| 26 | 47 | 55.23 |
| 27 | 48 | −69.37 |
| 28 | 50 | 72.89 |

-continued

| [Unit mm] | | |
|---|---|---|
| 29 | 52 | 0.00 |
| 30 | 53 | 0.00 |

Numerical Embodiment 6

[Unit mm]

Surface data

| Surface number | r | d | nd | vd |
|---|---|---|---|---|
| 1 | 2550.574 | 5.50 | 1.83400 | 37.2 |
| 2 | 358.822 | 2.00 | | |
| 3 | 360.578 | 25.13 | 1.43387 | 95.1 |
| 4 | −698.943 | 26.64 | | |
| 5 | 362.553 | 18.28 | 1.43387 | 95.1 |
| 6 | −2879.955 | 0.11 | | |
| 7 | 255.750 | 18.62 | 1.43387 | 95.1 |
| 8 | 1545.538 | 1.50 | | |
| 9 | 187.634 | 14.84 | 1.43875 | 94.7 |
| 10 | 376.362 | (variable) | | |
| 11* | −477.702 | 2.20 | 2.00330 | 28.3 |
| 12 | 35.584 | 13.01 | | |
| 13 | −40.423 | 1.45 | 1.74951 | 35.3 |
| 14 | 68.714 | 10.75 | 1.92286 | 18.9 |
| 15 | −46.340 | 1.37 | | |
| 16 | −39.496 | 2.00 | 1.91650 | 31.6 |
| 17 | −82.618 | (variable) | | |
| 18 | 120.906 | 15.70 | 1.72916 | 54.7 |
| 19* | −160.885 | 9.75 | | |
| 20 | 89.745 | 10.47 | 1.49700 | 81.5 |
| 21 | 558.194 | 2.60 | 2.00330 | 28.3 |
| 22 | 88.968 | (variable) | | |
| 23 | 99.262 | 13.16 | 1.43875 | 94.7 |
| 24 | −153.613 | 2.50 | 1.85478 | 24.8 |
| 25 | −254.493 | 0.19 | | |
| 26* | 3077.637 | 6.12 | 1.60311 | 60.6 |
| 27 | −180.143 | (variable) | | |
| 28(stop) | ∞ | 5.23 | | |
| 29 | −97.640 | 1.40 | 1.83481 | 42.7 |
| 30 | 56.154 | 0.50 | | |
| 31 | 33.774 | 4.31 | 1.80810 | 22.8 |
| 32 | 201.710 | 3.59 | | |
| 33 | −60.627 | 1.40 | 1.88300 | 40.8 |
| 34 | −362.320 | 4.66 | | |
| 35 | 104.766 | 1.50 | 1.83481 | 42.7 |
| 36 | 28.532 | 3.60 | 1.72825 | 28.5 |
| 37 | 57.274 | 4.85 | | |
| 38 | −44.510 | 1.50 | 1.91650 | 31.6 |
| 39 | 103.238 | 7.66 | 1.51742 | 52.4 |
| 40 | −24.689 | 16.00 | | |
| 41 | 96.227 | 6.13 | 1.63980 | 34.5 |
| 42 | −45.494 | 1.70 | | |
| 43 | −62.145 | 1.50 | 1.88300 | 40.8 |
| 44 | 45.533 | 8.55 | 1.43875 | 94.7 |
| 45 | −88.057 | 0.20 | | |
| 46 | 49.743 | 7.25 | 1.51633 | 64.1 |
| 47 | −42.988 | 1.50 | 1.91650 | 31.6 |
| 48 | −135.755 | 0.20 | | |
| 49 | 66.978 | 4.58 | 1.58144 | 40.8 |
| 50 | −168.876 | 5.00 | | |
| 51 | ∞ | 33.00 | 1.60859 | 46.4 |
| 52 | ∞ | 13.20 | 1.51633 | 64.2 |
| 53 | ∞ | 13.30 | | |
| Image plane | ∞ | | | |

Aspheric surface data

11th surface

K = 0.00000e+000
A4 = 1.83609e−006
A6 = −6.30361e−010

[Unit mm]

A8 = 7.63784e−013
A10 = −3.16575e−015
A12 = 7.59157e−018
A14 = −8.97741e−021
A16 = 4.31396e−024
19th surface K = 0.00000e+000
A4 = 2.64274e−007
A6 = 7.55668e−012
A8 = −5.87841e−014
A10 = 8.61821e−017
A12 = −6.64826e−020
A14 = 2.64407e−023
A16 = −4.26116e−027
26th surface K = 0.00000e+000
A4 = −2.26585e−007
A6 = 2.05948e−012
A8 = −2.29236e−013
A10 = 6.05997e−016
A12 = −1.55559e−018
A14 = −6.46245e−022
A16 = 6.11257e−026
A13 = 5.62796e−020
A15 = −1.84042e−024

Various data
Zoom ratio 100.00

| | | | | | |
|---|---|---|---|---|---|
| Focal length | 8.20 | 25.93 | 100.00 | 340.00 | 820.00 |
| F-number | 1.80 | 1.80 | 1.80 | 1.80 | 4.30 |
| Half angle of view (deg) | 33.85 | 11.98 | 3.15 | 0.93 | 0.38 |
| Image height | 5.50 | 5.50 | 5.50 | 5.50 | 5.50 |
| Total lens length | 672.30 | 672.30 | 672.30 | 672.30 | 672.30 |
| BF | 13.30 | 13.30 | 13.30 | 13.30 | 13.30 |
| d10 | 3.49 | 91.43 | 162.49 | 189.91 | 198.89 |
| d17 | 305.18 | 181.01 | 106.00 | 54.67 | 8.00 |
| d22 | 4.47 | 28.13 | 7.46 | 5.83 | 14.07 |
| d27 | 2.96 | 15.53 | 40.15 | 65.69 | 95.14 |
| d53 | 13.30 | 13.30 | 13.30 | 13.30 | 13.30 |
| Entrance pupil position | 127.61 | 367.77 | 1225.31 | 3813.40 | 12111.84 |
| Exit pupil position | 158.03 | 158.03 | 158.03 | 158.03 | 158.03 |
| Front principal point position | 136.28 | 398.35 | 1394.40 | 4952.13 | 17577.74 |
| Rear principal point position | 5.10 | −12.63 | −86.70 | −326.70 | −806.70 |

Zoom lens unit data

| Unit | Start surface | Focal length | Lens structure length | Front principal point position | Rear principal point position |
|---|---|---|---|---|---|
| 1 | 1 | 259.86 | 112.62 | 62.72 | −22.06 |
| 2 | 11 | −25.83 | 30.78 | 2.04 | −21.38 |
| 3 | 18 | 132.36 | 38.52 | −16.38 | −37.24 |
| 4 | 23 | 119.49 | 21.98 | 7.32 | −7.62 |
| 5 | 28 | 41.07 | 139.00 | 57.02 | 11.19 |

Individual lens data

| Lens | Start surface | Focal length |
|---|---|---|
| 1 | 1 | −498.07 |
| 2 | 3 | 550.83 |
| 3 | 5 | 741.60 |
| 4 | 7 | 701.51 |
| 5 | 9 | 830.73 |
| 6 | 11 | −32.66 |
| 7 | 13 | −33.54 |
| 8 | 14 | 31.02 |
| 9 | 16 | −83.82 |
| 10 | 18 | 96.53 |
| 11 | 20 | 212.96 |

-continued

[Unit mm]

| | | |
|---|---|---|
| 12 | 21 | −104.91 |
| 13 | 23 | 139.30 |
| 14 | 24 | −454.31 |
| 15 | 26 | 281.27 |
| 16 | 29 | −42.29 |
| 17 | 31 | 49.12 |
| 18 | 33 | −82.16 |
| 19 | 35 | −47.13 |
| 20 | 36 | 73.53 |
| 21 | 38 | −33.52 |
| 22 | 39 | 39.14 |
| 23 | 41 | 48.78 |
| 24 | 43 | −29.40 |
| 25 | 44 | 69.59 |
| 26 | 46 | 45.71 |
| 27 | 47 | −68.66 |
| 28 | 49 | 82.60 |
| 29 | 51 | 0.00 |
| 30 | 52 | 0.00 |

TABLE 1

| | | Embodiment | | | | | |
|---|---|---|---|---|---|---|---|
| Conditional expression | | 1 | 2 | 3 | 4 | 5 | 6 |
| (1) | (ft/fw)/(β2t/β2w) | 6.24 | 5.37 | 5.73 | 3.10 | 5.64 | 5.35 |
| (2) | f3n/f3 | −1.33 | −1.10 | −1.02 | −2.25 | −1.40 | −0.79 |
| (3) | \|ft/f1\| | 4.06 | 3.27 | 3.63 | 1.31 | 3.30 | 3.16 |
| (4) | \|f1/f2\| | 10.45 | 9.55 | 10.83 | 4.56 | 10.30 | 10.06 |
| (5) | vd3p − vd3n | 49.87 | 43.31 | 36.07 | 51.32 | 43.31 | 39.84 |
| (6) | Nd3a | 1.73 | 1.73 | 1.60 | 1.70 | 1.73 | 1.73 |
| (7) | (L34z1 − L34w)/L23w | 0.06 | 0.09 | 0.07 | 0.18 | 0.04 | 0.08 |
| (8) | f3/f4 | 1.20 | 1.18 | 1.50 | 1.67 | 1.06 | 1.11 |
| (9) | m3/Td | −0.16 | −0.19 | −0.15 | −0.13 | −0.16 | −0.17 |
| (10) | m2a/m2b | 1.00 | 1.00 | 1.00 | 1.00 | 1.001 | 1.00 |
| | β2w | −0.12 | −0.13 | −0.12 | −0.12 | −0.12 | −0.13 |
| | β2t | −2.30 | −2.50 | −2.30 | −2.14 | −2.14 | −2.34 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-034960, filed Feb. 28, 2018, which is hereby incorporated by reference herein in its entirety.

What is claimed is:

1. A zoom lens comprising in order from an object side to an image side:
   a first lens unit having a positive refractive power and configured not to move for zooming;
   a second lens unit having a negative refractive power and configured to move for zooming;
   a third lens unit having a positive refractive power and configured to move for zooming;
   a fourth lens unit having a positive refractive power and configured to move for zooming; and
   a fifth lens unit having a positive refractive power and configured not to move for zooming, wherein
   an interval between each pair of adjacent lens units of the first to fifth lens units changes for zooming,
   the third lens unit consists of, in order from the object side to the image side, a positive lens, a positive lens, and a negative lens, and conditional expressions $$2.1 < (ft/fw)/(\beta 2t/\beta 2w) < 0,$$

$$-1.40 \leq f3n/f3 \leq -0.76, \text{ and}$$

$$10 < vd3p - vd3n < 54$$

are satisfied where fw is a focal length of the zoom lens at a wide angle end, ft is a focal length of the zoom lens at a telephoto end, β2w is a lateral magnification of the second lens unit at the wide angle end, β2t is a lateral magnification of the second lens unit at the telephoto end, f3 is a focal length of the third lens unit, f3n is a focal length of the negative lens in the third lens unit, vd3p is an average of Abbe numbers of the positive lenses in the third lens unit, and vd3n is an Abbe number of the negative lens in the third lens unit.

2. The zoom lens according to claim 1, wherein conditional expressions $$1.2 < |ft/f1| < 5.0, \text{ and}$$

$$3.0 < |f1/f2| < 15.0$$

are satisfied where f1 is a focal length of the first lens unit, and f2 is a focal length of the second lens unit.

3. The zoom lens according to claim 1, wherein a conditional expression $$1.6 < Nd3a$$

is satisfied where Nd3a is a refractive index of the lens closest to the object side in the third lens unit.

4. The zoom lens according to claim 1, wherein a conditional expression $$0.02 < (L34z1 - L34w)/L23w < 0.2$$

is satisfied where L23w is an interval between the second lens unit and the third lens unit at the wide angle end, L34w is an interval between the third lens unit and the fourth lens unit at the wide angle end, and L34z1 is an interval between the third lens unit and the fourth lens unit at a focal length of fw×z$^{0.25}$, z being a zoom ratio of the zoom lens.

5. The zoom lens according to claim 1, wherein a conditional expression $$0.8 < f3/f4 < 1.7$$

is satisfied where f4 is a focal length of the fourth lens unit.

6. The zoom lens according to claim 1, wherein
the third lens unit is configured to move to the object side for zooming from the wide angle end to the telephoto end, and
a conditional expression $$0.05 < m3/Td < 0.3$$

is satisfied where m3 is an amount by which the third lens unit moves from the wide angle end to the telephoto end, and Td is a distance from a vertex of a lens surface, closest to the object side, in the first lens unit to a vertex of a lens surface, closest to the image side, in the fifth lens unit.

7. The zoom lens according to claim 1, wherein
the second lens unit consists of a 2a lens unit and a 2b lens unit in order from the object side to the image side, and
a conditional expression $$0.9 < m2a/m2b < 1.1$$

is satisfied where m2a is an amount by which the 2a lens unit moves from the wide angle end to the telephoto end, and m2b is an amount by which the 2b lens unit moves from the wide angle end to the telephoto end.

8. An image pickup apparatus comprising:
a zoom lens; and
an image pickup element disposed at an image plane of the zoom lens,
wherein the zoom lens comprises in order from an object side to an image side:
a first lens unit having a positive refractive power and configured not to move for zooming;
a second lens unit having a negative refractive power and configured to move for zooming;
a third lens unit having a positive refractive power and configured to move for zooming;
a fourth lens unit having a positive refractive power and configured to move for zooming; and
a fifth lens unit having a positive refractive power and configured not to move for zooming, wherein
an interval between each pair of adjacent lens units of the first to fifth lens units changes for zooming,
the third lens unit consists of, in order from the object side to the image side, a positive lens, a positive lens, and a negative lens, and
conditional expressions $$2.1 < (ft/fw)/(\beta 2t/\beta 2w) < 10,$$

$$-1.40 \leq f3n/f3 \leq -0.76, \text{ and}$$

$$10 < vd3p - vd3n < 54$$

are satisfied where fw is a focal length of the zoom lens at a wide angle end, ft is a focal length of the zoom lens at a telephoto end, β2w is a lateral magnification of the second lens unit at the wide angle end, β2t is a lateral magnification of the second lens unit at the telephoto end, f3 is a focal length of the third lens unit, f3n is a focal length of the negative lens in the third lens unit, vd3p is an average of Abbe numbers of the positive lenses in the third lens unit, and vd3n is an Abbe number of the negative lens in the third lens unit.

9. A zoom lens comprising in order from an object side to an image side:
a first lens unit having a positive refractive power and configured not to move for zooming;
a second lens unit having a negative refractive power and configured to move in zooming;
a third lens unit having a positive refractive power and configured to move in zooming;
a fourth lens unit having a positive refractive power and configured to move in zooming; and
a fifth lens unit having a positive refractive power and configured not to move for zooming, wherein an interval between each pair of adjacent lens units of the first to fifth lens units changes in zooming, the third lens unit consists of two positive lenses and a negative lens, and conditional expressions $$2.1 < (ft/fw)/(\beta 2t/\beta 2w) < 10,$$

$$-1.40 \leq f3n/f3 \leq -0.76, \text{ and}$$

$$10 < vd3p - vd3n < 54$$

are satisfied where fw is a focal length of the zoom lens at a wide angle end, ft is a focal length of the zoom lens at a telephoto end, β2w is a lateral magnification of the second lens unit at the wide angle end, β2t is a lateral magnification of the second lens unit at the telephoto end, f3 is a focal length of the third lens unit, f3n is a focal length of the negative lens in the third lens unit, vd3p is an average of Abbe numbers of the positive lenses in the third lens unit, and vd3n is an Abbe number of the negative lens in the third lens unit.

10. The zoom lens according to claim 9, wherein conditional expressions $$1.2 < |ft/fl| < 5.0, \text{ and}$$

$$3.0 < |f1/f2| < 15.0$$

are satisfied where f1 is a focal length of the first lens unit, and f2 is a focal length of the second lens unit.

11. The zoom lens according to claim 9, wherein a conditional expression $$1.6 < Nd3a$$

is satisfied where Nd3a is a refractive index of the lens closest to the object side in the third lens unit.

12. The zoom lens according to claim 9, wherein a conditional expression $$0.02 < (L34z1 - L34w)/L23w < 0.2$$

is satisfied where L23w is an interval between the second lens unit and the third lens unit at the wide angle end, L34w is an interval between the third lens unit and the fourth lens unit at the wide angle end, and L34z1 is an interval between the third lens unit and the fourth lens unit at a focal length of fw×z0.25, z being a zoom ratio of the zoom lens.

13. The zoom lens according to claim 9, wherein a conditional expression $$0.8 < f3/f4 < 1.7$$

is satisfied where f4 is a focal length of the fourth lens unit.

14. The zoom lens according to claim 9, wherein the third lens unit is configured to move to the object side in zooming from the wide angle end to the telephoto end, and
a conditional expression $$0.05 < m3/Td < 0.3$$

is satisfied where m3 is an amount by which the third lens unit moves from the wide angle end to the telephoto end, and Td is a distance from a vertex of a lens surface, closest to the object side, in the first lens unit to a vertex of a lens surface, closest to the image side, in the fifth lens unit.

15. The zoom lens according to claim 9, wherein the second lens unit consists of a 2a lens unit and a 2b lens unit in order from the object side to the image side, and a conditional expression $$0.9 < m2a/m2b < 1.1$$

is satisfied where m2a is an amount by which the 2a lens unit moves from the wide angle end to the telephoto end, and m2b is an amount by which the 2b lens unit moves from the wide angle end to the telephoto end.

16. An image pickup apparatus comprising:
a zoom lens; and
an image pickup element configured to pick up an image formed by the zoom lens, wherein the zoom lens comprises in order from an object side to an image side:
a first lens unit having a positive refractive power and configured not to move for zooming;
a second lens unit having a negative refractive power and configured to move in zooming;
a third lens unit having a positive refractive power and configured to move in zooming;
a fourth lens unit having a positive refractive power and configured to move in zooming; and
a fifth lens unit having a positive refractive power and configured not to move for zooming, wherein an interval between each pair of adjacent lens units of the first to fifth lens units changes for zooming, the third lens unit consists of two positive lenses and a negative lens, and conditional expressions $2.1 < (ft/fw)/(\beta 2t/\beta 2w) < 10,$ $-1.40 \leq f3n/f3 \leq -0.76,$ and $10 < vd3p - vd3n < 54$ are satisfied where fw is a focal length of the zoom lens at a wide angle end, ft is a focal length of the zoom lens at a telephoto end, $\beta 2w$ is a lateral magnification of the second lens unit at the wide angle end, $\beta 2t$ is a lateral magnification of the second lens unit at the telephoto end, f3 is a focal length of the third lens unit, f3n is a focal length of the negative lens in the third lens unit, vd3p is an average of Abbe numbers of the positive lenses in the third lens unit, and vd3n is an Abbe number of the negative lens in the third lens unit.

* * * * *